US008918380B2

(12) United States Patent
Sjøgren

(10) Patent No.: US 8,918,380 B2
(45) Date of Patent: Dec. 23, 2014

(54) METHODS, SYSTEMS AND DEVICES FOR PERFORMING INCREMENTAL UPDATES OF PARTIAL DATABASES

(75) Inventor: Bjørn-Harald Sjøgren, Ski (NO)

(73) Assignee: Norsync Technology AS, Oslo (NO)

( * ) Notice: Subject to any disclaimer, the term of this patent is extended or adjusted under 35 U.S.C. 154(b) by 571 days.

(21) Appl. No.: 12/500,370

(22) Filed: Jul. 9, 2009

(65) Prior Publication Data

US 2011/0010344 A1   Jan. 13, 2011

(51) Int. Cl.
*G06F 17/30* (2006.01)
(52) U.S. Cl.
CPC .............................. *G06F 17/30575* (2013.01)
USPC ........................................................ 707/703
(58) Field of Classification Search
USPC ......... 707/703, 672, 676, 680, 681, 682, 685, 707/689, 690
See application file for complete search history.

(56) References Cited

U.S. PATENT DOCUMENTS

| 5,758,337 | A | * | 5/1998 | Hammond | 1/1 |
| 5,758,355 | A | * | 5/1998 | Buchanan | 1/1 |
| 6,098,075 | A | * | 8/2000 | Becraft et al. | 1/1 |
| 6,216,135 | B1 | * | 4/2001 | Brodersen et al. | 1/1 |
| 6,651,047 | B1 | * | 11/2003 | Weschler, Jr. | 1/1 |
| 7,801,851 | B2 | * | 9/2010 | Holenstein et al. | 707/615 |
| 2004/0215670 | A1 | * | 10/2004 | Holenstein et al. | 707/201 |
| 2005/0038810 | A1 | * | 2/2005 | Brodersen et al. | 707/102 |
| 2007/0276858 | A1 | * | 11/2007 | Cushman et al. | 707/102 |
| 2010/0153423 | A1 | * | 6/2010 | Lu et al. | 707/759 |

FOREIGN PATENT DOCUMENTS

| JP | 2000-276391 A | 10/2000 |
| JP | 2001-117800 A | 4/2001 |
| JP | 2001-142766 A | 5/2001 |
| JP | 2002-511164 A | 4/2002 |
| JP | 2003-527688 A | 9/2003 |
| WO | WO 98/38586 A1 | 3/1998 |
| WO | WO 9838586 A1 * | 9/1998 |

* cited by examiner

*Primary Examiner* — Ajay Bhatia
*Assistant Examiner* — Fatima Mina
(74) *Attorney, Agent, or Firm* — Birch, Stewart, Kolasch & Birch, LLP

(57) ABSTRACT

Methods, systems and devices for performing incremental updates of a partial database stored on a client device from a computer system containing the database of which the partial database is a subset. A first database record which has been inserted into, deleted from or changed in the server database as a result of a database operation is identified in order to perform a corresponding operation on the client device. In addition, a second record that has not been inserted, deleted or changed, but that is related to the first record through a constraint, is identified. The second record is inserted into or deleted from the partial database through a database operation performed on the client device such that the constraint is fulfilled in the partial database. Identification of records is based on database logs and on the structured relationship between record types.

21 Claims, 11 Drawing Sheets

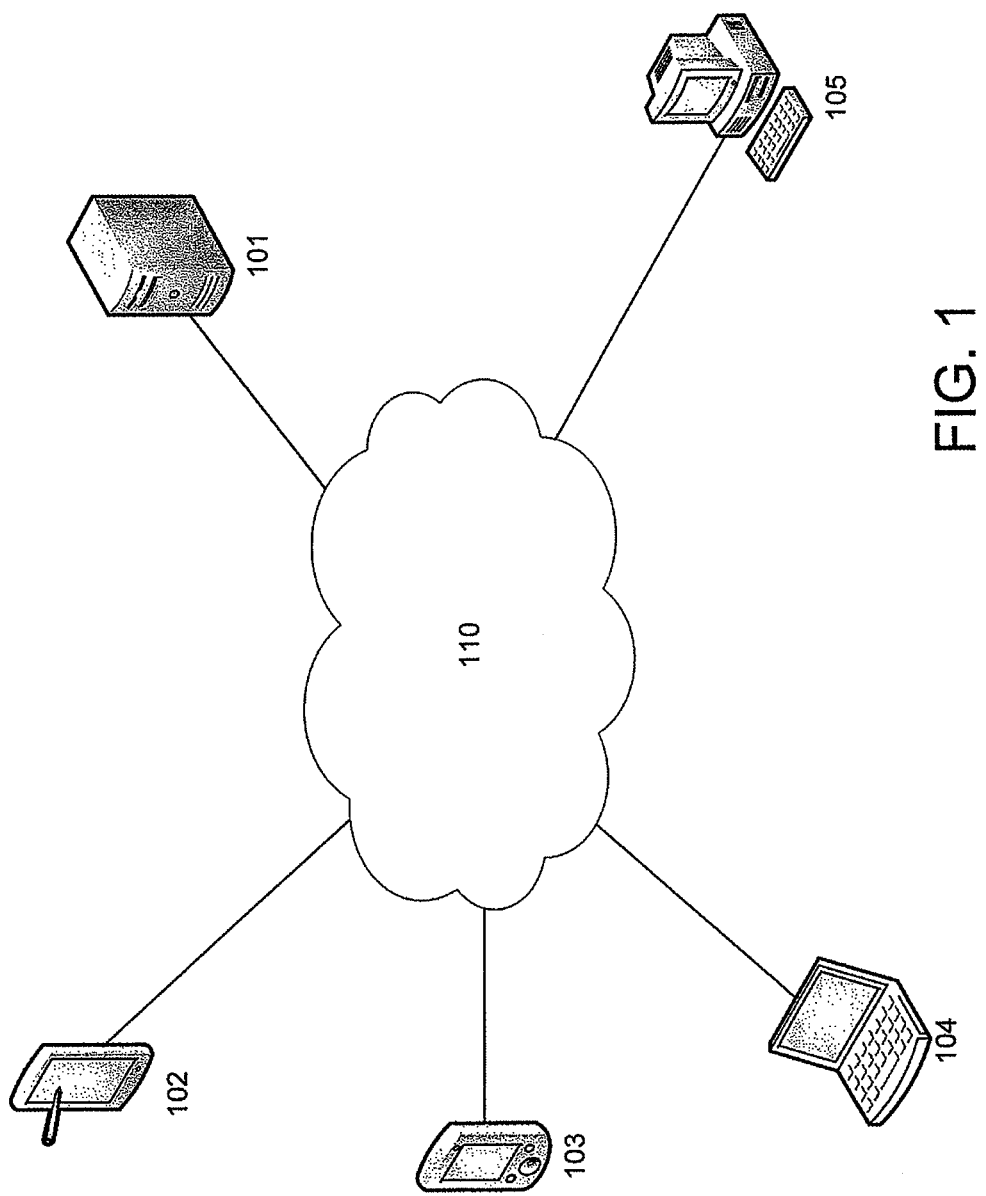

FIG. 2A

201 Assignment

| Representative | Department |
|---|---|
| 104 | 10001 |
| | |
| | |

202

| Department |
|---|
| 10001 |
| 10002 |

203 Department_Product

| Department | Product |
|---|---|
| 10001 | 5001 |
| 10001 | 5002 |
| 10002 | 5008 |
| 10001 | 5005 |
| 10002 | 5010 |
| 10001 | 5003 |
| 10001 | 5006 |

204 Products

| Product | ProductName |
|---|---|
| 5001 | ... |
| 5002 | ... |
| 5003 | ... |
| 5004 | ... |
| 5005 | ... |
| 5006 | ... |
| 5007 | ... |
| 5008 | ... |
| 5009 | ... |
| 5010 | ... |

FIG. 2B

201 Assignment

| Representative | Department |
|---|---|
| 104 | 10001 |
| | |
| | |

202

| Department |
|---|
| 10001 |
| 10002 |

203 Department_Product

| Department | Product |
|---|---|
| 10001 | 5001 |
| 10001 | 5002 |
| 10002 | 5008 |
| 10001 | 5005 |
| 10002 | 5010 |
| 10001 | 5003 |
| 10001 | 5006 |

204 Products

| Product | ProductName |
|---|---|
| 5001 | ... |
| 5002 | ... |
| 5003 | ... |
| 5004 | ... |
| 5005 | ... |
| 5006 | ... |
| 5007 | ... |
| 5008 | ... |
| 5009 | ... |
| 5010 | ... |

METHODS, SYSTEMS AND DEVICES FOR PERFORMING INCREMENTAL UPDATES OF PARTIAL DATABASES

BACKGROUND OF THE INVENTION

1. Field of the Invention

The present invention relates to data synchronization between server computers and client computers. More particularly, the invention relates to tracking and collecting changes in a server database and one or more client databases and synchronizing in accordance with relevant changes.

2. Description of Relevant Art

Databases that are stored in central computer server systems may be partially duplicated or copied in client computers that may not always be online. Consequently there arises a need for database synchronization between the database server system and one or more client computers, and the synchronization may involve changes in both directions, i.e. changes may have been made to the data on the client computers as well as on the server system. In addition to data that should be transferred to a client because the data has changed on the server, it may be necessary to transfer data that has not been changed but that has become relevant to a client some time after the previous synchronization as a result of some other change in the database. In other words, in addition to updating the client with data records that have been changed on the server, some records that have not been changed on the server may nevertheless have to be deleted from or added to a client computer.

An example may involve mobile devices that contain a partial database representing stock inventory of a store. The devices may be used to take inventory or register necessary purchases to resupply. It will then readily be understood that changes may have been made to the list of available products registered in the central database since a mobile device was last synchronized. Similarly, changes may have been made to the mobile device representing an actual inventory registered by an employee in the store, or an order to make a purchase to restock a particular good. In addition, changes may have been made that changes which part of the data available from the central database is relevant to the partial database on the client device.

For example, a client device may have been used to take inventory in a hardware department and a sports department of a store and consequently having been updated with a partial database including hardware products and sports products. At a subsequent occasion the same device may be reassigned to register necessary purchases in a clothing department of the same store, while it is no longer used in the hardware department. A synchronization of the client with the database should then remove the part of the database that relates to hardware products, add the part of the database that relates to sports products, and makes all necessary updates resulting from changes to the list of clothing products in the central database.

A brute force solution to the problem of synchronizing clients is to first import all updates that have been made on the client to the database, then delete all database data on the client, and finally export the entire database or partial database to the client again. This ensures that all data on the client are current as of the time of synchronization, but it requires a lot of data transfer, and may also interfere with system's ability to handle interaction with other clients while synchronization is performed. It should be noted that the terms import and export will be used relative to the main (server) database unless otherwise noted. Thus, import, or import to, refers to the introduction of new data to the database from a client, while export, or export from, means introducing or updating data from the server database to a client database.

An alternative that has been proposed is to maintain a database log of all updates to all records in the main database, and to base synchronization on this log. If the state of the database at the previous synchronization is known and all database transactions between the previous synchronization and the ongoing synchronization is known, it is possible to update the client based on the log of changes and without interfering with the actual database. Based on the log a summary of all changes to the database between two synchronizations can be created. This summary can be thought of as a database Δ, the difference in the database between two synchronizations.

Using the database Δ to update the clients is fairly straightforward if the clients contain complete copies of the main database. In that case the client should be updated with the entire database Δ; all changes should be sent to the client. However, if the client only contains a partial database, it is necessary to identify the records in the database Δ that are relevant to the particular client that is being synchronized, and only transfer those. In addition, it may be necessary to transfer records that have not changed, i.e. that are not part of the database Δ, but that become necessary to the client for other reasons.

An unchanged record may have become relevant to a client for different reasons. Generally speaking, two classes of reasons can be identified, and they may be referred to as internal reasons and external reasons. Internal reasons include cases where a change in one record (a record that is part of the database Δ) makes it necessary to import additional (unchanged) records to the client in order to fulfill constraints and ensure that relevant data is actually present on the client. External reasons include cases where some fact external to the database itself makes it appropriate to import a record to the client, for example a particular point in time. An example of the latter could be a work order that was prepared even at the previous synchronization, but that should not be transferred to the client until the day before the work is due to be performed.

For similar reasons, records that were relevant to the partial database in the client at the previous synchronization, may have become irrelevant even if the record itself has not changed, and it may consequently be necessary to remove unchanged records.

Consequently there is a need for methods and systems that are able to perform incremental synchronization of partial databases while fulfilling constraints.

SUMMARY OF THE INVENTION

The present invention is directed to methods, computer systems and computer readable media for updating or synchronizing client devices from server computer systems. The server computer system includes a database and the client devices hold partial representations of the database on the server. A partial representation of a database includes a subset of the database records present in the server computer system, and this subset can be referred to as records that are accepted at a client. The method allows incremental synchronization of clients while database constraints are fulfilled.

A server computer operating in accordance with the invention in order to update an electronic client device from the server computer, may therefore include a first database with a plurality of database records while the client device includes a partial representation of the first database. The partial database includes database records accepted at the client device. A method running on such a computer system may then comprise identifying a first record that has been inserted into, deleted from or changed in the first database subsequent to a previous update of the client, and identifying a second record which has not been added to, deleted from or changed in the first database, but which is related to the first record through a constraint. Based on these identified records, the method then transmits first data from the server computer instructing the client device to perform a corresponding insert into, deletion from or change of the first record in the partial representation of the first database, and it transmits second data from the server computer, the second data instructing the client device to insert the second record into or delete the second record from the partial representation of the first database such that the constraint is fulfilled in the partial representation of the first database.

It should be noted that a constraint may be a declared database constraint such as for example a foreign key constraint implemented by means of a database management system (DBMS), but it may also be defined as part of the rules of the synchronization mechanism itself.

The identification of the first record may, according to a first embodiment of the invention, be based on a determination of the beginning and the end of a time window, the beginning representing a point in time associated with the previous update of the client device, and the end representing a point in time associated with a current update of the client device, and a process of scanning a log of database operations performed by the server computer. The first record can then be identified as a record upon which at least one database operation has been performed during the time window.

Prior to transmitting the first data to the client device, one embodiment of the invention includes performing at least one of scanning the log to determine at least one value representative of the state of the first record at the beginning of the time window and determining if the value was accepted in the partial database at the beginning of the time window, and scanning the log to determine a corresponding value representative of the state of the first record at the end of the time window and determining if the value should be accepted in the partial database at the end of the time window. The determination of acceptance can be based on at least one of the value representative of the state of the record, a declared rule for the record type of the first record, and a corresponding determination for a record different from the first record, but associated with it through a subset constraint. If the database operation performed on the first record in the server computer represented an insertion of the first record into the first database, the data can then be configured to represent an instruction to insert the first record in the partial database if it was determined that the value representative of the state of the first record at the end of the time window should be accepted in the partial database at the end of the time window. Similarly, if the database operation represented a deletion of the first record from the first database, the data can be configured to represent an instruction to delete the first record if it was determined that the value representative of the state of the first record at the beginning of the time window was accepted in the partial database at the beginning of the time window. If the database operation represented a change of the first record in the first database, the data can be configured to represent an instruction to do one of the following, namely i) change the first record in the partial database if it was determined that the value representative of the state of the first record at the beginning of the time window was accepted in the partial database and the value representative of the state of the first record at the end of the time window should be accepted in the partial database, ii) delete the first record from the partial database if it was determined that the value representative of the state of the first record at the beginning of the time window was accepted in the partial database and that the value representative of the state of the first record at the end of the time window should not be accepted in the partial database, and iii) insert the first record into the partial database if it was determined that the value representative of the state of the first record at the beginning of the time window was not accepted in the partial database and the value representative of the state of the first record at the end of the time window should be accepted in the partial database.

Corresponding actions can be performed prior to transmitting the second data to the client device, but since the second record is a record that has not been changed on the server, it is normally not necessary to transmit instructions to change such a record in the partial database. However, in some embodiments of the invention, the data configured to instruct database operations to be performed on the client device may be configured by the same methods, or computer code, irrespective of whether the instructions relates to a record that has been changed or a record that has not been changed.

According to one aspect of the invention, the corresponding determination of acceptance for a different record is performed by repeating the steps of scanning the log to determine a representative value and determining acceptance of this value on the client. This can for example be implemented in the form of recursive calls to the same function, method or procedure.

According to another aspect of the invention, a declared rule for a record type is a function which accepts a value representative of the state of a record of that record type as input, and produces a corresponding determination of acceptance for this value on the client. Since the value is representative of the sate of the record, the determination typically is a determination of whether the record should be accepted in the client database.

In one embodiment of the invention, at least one declared rule is declared by a programmer or a user of the database.

While the second record is an unchanged record needed in the partial database because of its relation to a changed first record through a constraint, the fact that the second record is added to or removed from the partial database may require additional addition or removal of a third record related to the second record through a similar constraint. Consequently, according to another aspect of the invention a method may include identifying a third record which has not been added to, deleted from or changed in the first database, but which is related to the second record through a constraint and which should be similarly added to or removed from the partial database to fulfill that constraint. The method may then transmit third data to the client device instructing the device to insert the third record into or delete the third record from the partial representation of the first database such that the constraint is fulfilled in the partial representation of the first database, and then repeat the steps of identifying records and transmitting data until all constraints have been fulfilled in the partial database.

According to one embodiment of the invention, the first record is of a record type associated with a declared rule for determining acceptance of a value representative of the state of a record of that record type on a client, and the second record is of a record type which is a subset member record type with respect to the first record type.

According to another embodiment, the first record is of a record type which is a subset member record type of a record type associated with a declared rule for determining acceptance of a value representative of the state of a record of that record type on a client, and the second record is of a record type that is a subset member record type with respect to the first record type.

According to yet another embodiment, the first record is of a record type which is a subset member of two record types, the record type of the second record and a record type different from the record type of the first record and of the second record. In this embodiment the record with a record type different from the first record and different from the second record is associated with a declared rule for determining acceptance of a value representative of the state of a record of that record type on a client, while the second record is of a record type associated with a declared rule stating that records of the second record type should only be accepted in the partial database if required to fulfill a constraint relating it to at least one record of the record type of the first record.

According to yet another embodiment, the first record is of a record type associated with a declared rule stating that records of the first record type should only be accepted in the partial database if required to fulfill a constraint relating it to at least one record of a record type different from the first record and the second record, and the second record is of a record type that is a subset member record type with respect to the first record type.

It should be noted that the various scans of a log of database operations described above can be performed as one scan where all relevant information is acquired, or scans may be performed repeatedly in order to acquire only one or a few data items for each scanning operation.

In some embodiments the relationships between the first, second and third record types are explicitly defined as roles. Embodiments of the invention can implement any combination of roles, explicitly or implicitly, depending on design criteria.

The computer systems of the invention may include one or more server computers with processors programmed to perform the method of the invention in order to update electronic client devices. Computer readable media of the invention may include instructions which, when executed, cause a server computer to perform the method of the invention. Computer readable media may for example be magnetically or optically readable media such as hard drives, CD-ROM or DVD-ROM, flash memory, Electrically Erasable Programmable Read Only Memory (EEPROM), or any other convenient type of storage device known to those with skill in the art.

The details of the invention are defined in the appended claims, while exemplary embodiments are set forth below with reference to the drawings.

BRIEF DESCRIPTION OF THE DRAWINGS

Exemplary embodiments of the present invention will become more fully understood from the detailed description given hereinbelow and the accompanying drawings. These drawings are given by way of illustration only and, thus, are not limiting on the present invention. In these drawings, like reference numerals represent like elements, wherein:

FIG. 1 is a diagram illustrating a system including a server and clients that can be synchronized in accordance with the present invention;

FIG. 2 is a diagram illustrating exemplary values of select tables before and after synchronization of database clients in accordance with the present invention

DETAILED DESCRIPTION OF EXEMPLARY EMBODIMENTS

Figure 3:
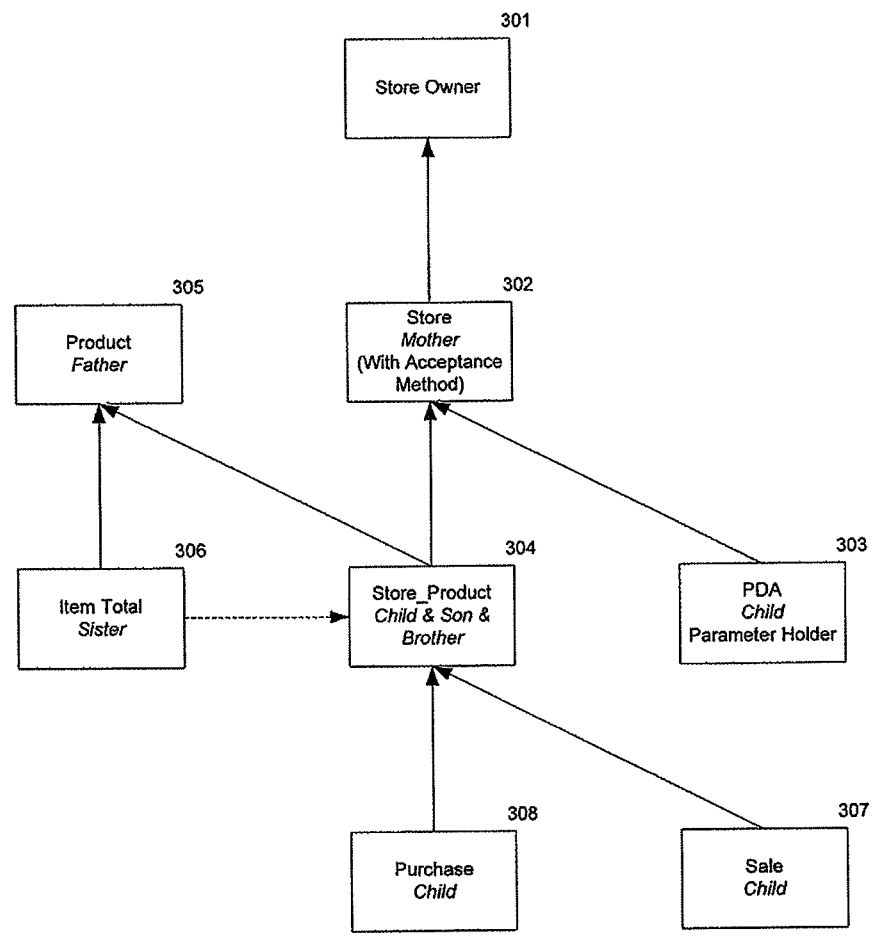
FIG. 3 shows an examples of tables and how they relate to each other in a database operating in accordance with the invention.

Reference will now be made in detail to embodiments, examples of which are illustrated in the accompanying drawings. In the following detailed description, various specific details are presented in order to facilitate a thorough understanding of the present invention. It will, however, be understood by those with skill in the art that the invention is not limited to the specific examples presented herein, and that the present invention may be practiced without these specific details. It will also be understood that a number of well-known methods, procedures, components, circuits, and networks have not been described in detail so as not to unnecessarily obscure aspects of the embodiments.

The present invention is related to synchronization of databases, and in particular to synchronization between client computers and server computers wherein the server computers host the entire database, and the client computers contain at least a subset of the data stored in the server computers. It should be noted that when this specification refers to the central database as an entire database or a complete database, the completeness only has to be with respect to its clients. The complete database does not have to be complete with respect to for example any other database at an even higher hierarchical level and from which the database receives data.

A client computer may be a personal computer connected permanently to a communication network such as the Internet, but a client computer may also be a laptop computer, a PDA (Personal Digital Assistance, also known as a palmtop computer or hand-held computer), or even a mobile telephone, a media player or an electronic gaming device. A client computer may therefore be provided with user interface devices such as one or more of a display, for example a touch screen, a physical or virtual keyboard, a pointing device, for example a mouse or a joystick, a scroll or click wheel, and a loudspeaker. For simplicity, in the discussion that follows, a portable multifunction device that includes a touch screen is used as an exemplary embodiment.

Reference is now made to FIG. 1, which illustrates a system including a central server and several client devices. The devices are all connected to a network 110, which may include one or more data communication networks such as the Internet, a wireless or fixed local area network (WLAN, LAN), a mobile telephone network (often referred to as a cellular network). A central server 101 is typically permanently connected to the network 110, and is used to host the various tables of records that make up the database. In addition the server 101 will typically host a database management system (DBMS) and a web server solution capable of providing a web based interface between the database and the clients. The database management system may for example be Microsoft SQL Server from Microsoft Corporation, ORACLE database from Oracle Corporation, or MYSQL from MySQL AB. The web server solution may for example be the APACHE HTTP Server from Apache Software Foundation, or Internet Information Services (IIS) from Microsoft Corporation, possibly in combination with a server side scripting language such as PHP, Python, Ruby on Rails or Server Side JavaScript (SSJS). The web server will then be able to serve database content to the clients using the HTTP and TCP/IP protocols, and the clients may access database content using web browser type applications running locally on the client device. Alternatively, proprietary protocols may be used and dedicated applications may be used by the clients instead of web browsers.

The server 101 may be implemented on a system of several computers, and replication, or mirroring, of data in several databases is also consistent with the principles of the invention. For the sake of clarity and to avoid unnecessary confusion, the exemplary embodiments described herein will be described as including only one server computer, but the invention is not limited in this respect.

A first client device 102 is shown as a PDA or tablet computer with a touch screen and a stylus type input device. A second client device 103 may for example be another PDA or a smart phone. A third client device 104 is illustrated as a laptop computer. A fourth client device 105 is shown as a personal computer or workstation. The personal computer 105 may be permanently online with the server 101. This represents traditional online client-server technology where there may be no need for synchronization Instead all changes made on the personal computer 105 can be transferred to the server 101 and stored in the database immediately. A practical example of a system configured as illustrated in FIG. 1 could be one in which the central database server 101 stores the entire inventory and list of available products from a chain of stores. Client computer 102 may be used by the driver of a delivery truck that restocks several stores with some types of products, for example clothing. Client computer 103 may be used to take inventory of all types of products in one particular store, and laptop 104 may be used by a sales representative visiting several stores and registering orders. The personal computer 105 may be used at a central office to manage the database server 101, enter new types of products and delete discontinued products from the database, change prices etc.

It will be readily understood by those with skill in the art that a number of changes may be made at the different client devices, including changes that are mutually inconsistent, changes that require update of other client devices, and in particular changes that require synchronization of data that has not been changed, but that has become relevant or irrelevant to a particular client device as a result of a change that was made at a different device. An example of the latter could be that a sales representative using laptop 104 is assigned to a new department in a store. An entry in an assignment table listing the various assignments of sales representatives may reflect this change, and the entry should be updated on the sales representatives laptop 104 the next time the client is synchronized. However, the sales representative will also need access to the entry for this department in his laptop, as well as records representing products stocked by this department. These records have not changed, but they still have to be added to the representative's laptop 104 at the next synchronization. It should be noted that the actual change to the assignment value can be made on the client itself or on the server. If the change is made on the client it can be imported to the server and then acted upon during the following synchronization.

While the example illustrated in FIG. 1 only includes one server and a plurality of clients connected directly to the server, the invention may be implemented in hierarchical systems where the clients themselves operate as servers with respect to additional clients not shown in the drawing.

Reference is now made to FIG. 2, which illustrates the example outlined above. In FIG. 2A a first table 201 called Assignment includes an entry referencing a Representative 104 and a Department 10001 to which the representative 104 is assigned. The entries may be foreign keys, i.e. keys that reference a key in a different table. For convenience the representative is identified by the same number as his client computer, which may be found in a corresponding table (not shown), while the department the representative is assigned to is identified by a number which can be found as a primary key in a table 202 of departments. A third table 203 lists which products can be found in which departments. The table shows a number of entries that in this particular example lists one of two departments 10001, 10002, and a product that can be found in that department. Entries can be inserted and deleted as products are added or removed from stock, or changed if a product is transferred from one department to another. Each entry is a foreign key reference to a different table. A final table 204 simply lists all products by product number and name. All records that should be present on the sales representative's client computer in tables are indicated by a gray pattern.

In FIG. 2B it can be seen from table 201 that the sales representative 104 now is assigned to department 10002. This is the only record in the database that has changed, but nevertheless the sales representative now needs access to the database entry for a different department in table 202. This means that while the entry for department 10001 can be removed from the client database, the entry for department 10002 should be exported to the client database.

However, it is not only sufficient to export the record that is referenced by the record that is changed in the assignment table 201. It may also be necessary to export all the records that reference the newly exported record. In this example that means that all entries in table 203 that reference the exported department record 10002 should also be exported, along with all the record in the products table 204 that are referenced by the newly exported records in table 203. In this manner, all products available in the new department will be present on the client device, as indicated by a gray pattern in the tables in FIG. 2B.

In order to facilitate synchronization, a log may be maintained on the server 101. The log can be created and maintained by the DBMS. A similar log can be maintained on all client devices. The log may be one or more lists separate from the database as such, or it may be implemented as one or more tables in a database.

One purpose of the log is to facilitate collection of database changes done in any time interval. Hereinbelow, such a time interval will be referred to as $\Delta t$ while the changes collected during $\Delta t$ will be referred to as the database $\Delta$. The database $\Delta$ refers only to the records that have actually been changed, not to records that need to be added to a client as a result of other changes. In the example above, the entry in the assignment table will be included in the database Δ, but not the affected entries for department and goods. Those affected records or entries will be referred to as having their acceptance changed with respect to the client, and the collection of all records that have not changed, but have had their acceptance changed will be referred to as the acceptance Δ. The sum of the database Δ and the acceptance Δ will be referred to as the triggered Δ.

The selection of the appropriate time window Δt can be based on prior synchronization of the client. For example, the time window can start one time unit after the end of the previous synchronization and end at the time unit when the current synchronization was initiated. A time unit may be one incremental step of a clock in the database and may be referred to as a "tick".

Another purpose of the log is to make it possible to obtain the value of any existent or nonexistent record occurrence at any time t. This in combination with configuring a client to keep track of when it was last synchronized, it becomes possible to synchronize any client at any time without configuring the server to prepare synchronization with any client before synchronization is actually initiated. However, it should be noted that some embodiments of the invention may implement purging of old records from the log. If, for example because of a purge, the log is incomplete for the time window determined when a client requests synchronization it may be necessary to perform a complete rather than an incremental update, since required values may be missing from the log.

The log may include log entries describing the full history of the database transition over time. Every insertion of a new record (INS) may create an entry of the type INS-entry, while every deletion of an existing record (DEL) may create an entry of the type DEL-entry. Every update of an existing record (UPD) may create a DEL-entry followed by an INS-entry.

A log entry can typically comprise the RID of the record occurrence, a timestamp indicating when the entry was made, a log status indicating the entry type, and all the columns of the record type.

The synchronization log entry may also identify which client originated the update. This can be used to prevent an update from being sent back to the originator as an update, which normally is considered unwanted behavior. There may, however, be exceptions to this rule, and in such a case the log entry may indicate this. An example of such an exception is when an import from a client is changed during the import process as a result of changes that have been made on the server after the last synchronization of the client. The changes made during import will then have to be returned back to the client, and in this case the update will have to be sent back to the originating device. An example of such a change could be that a product category of "clothing" has been changed to "apparel" on the server. When a new entry imported from the client includes the "clothing" value in one record column and this value is changed to "apparel" during import to the server, the entire record should be sent back to the originating device in order to update this value on the client.

Partitioned export refers to situations where the update is divided into several parts which are transferred separately. In order to facilitate partitioned export and also to enable recovery based on the actual last received occurrence, time window clocks defining the Δt as well as last record (Table Type and RID) are kept in the client database together with the synchronization log. According to some embodiments of the invention there is one set of clock values for the database. Alternative embodiments can include one Δt per foreign key hierarchy with a user defined acceptance method. Tables not belonging to any foreign key hierarchy can also have a separate Δt. This may result in a more flexible solution. The synchronization principle will remain the same, however.

A system area, which is a memory area that is internal to the client and normally not accessible to the user, can be used to hold information about clocks and progress information used by the synchronization process. This database log status area can be used to ensure that all necessary information is available in the database itself, and can facilitate a smooth and restartable process, for example if synchronization is interrupted due to loss of connection between client and server. Since all information necessary for synchronization is available from the database log, synchronization can be resumed from the point of interruption without any corruption resulting from changes done to the database after synchronization was initiated.

In order to avoid confusion resulting from daylight savings time, time zones, or any other kind of clock adjustment, database time stamps may include the actual system clock of the device performing the synchronization or an artificial clock or both. The systems clock time stamps may use Coordinated Universal Time (UTC) on all devices in order to make the time stamp independent of time zones. The artificial clock is actually a counter that increments with one for each database event. The artificial clock will therefore not be affected even if the systems clock is adjusted. However, the invention is not limited to any particular method of tracking time.

Synchronization logs are maintained on all computers and devices included in the system. A simplified example of a log is shown in Table 1:

TABLE 1

Synchronization Log

RID="1004"; Time="7354"; Logstatus="1"; Name="Men's Jacket"; Client="104"; #INS
RID="1002"; Time="7355"; Logstatus="0"; Name="Sweater"; Client="102"; #DEL
RID="2003"; Time="7356"; Logstatus="0"; PDA="102";Store="D"; Client="101";
RID="2003"; Time="7457"; Logstatus="1"; PDA="102"; Store="F"; Client="101"; #UPD This example shows first that a new item has been inserted in a products table with RID="1004". This example assumes that the first digit of the RID identifies the table. The time stamp is a counter of database events which has reached "7354", and Logstatus="1" indicates that this was an insert, as also indicated by the comment #INS at the end of this log entry. In the name column of this database record the value "Men's Jacket" has been inserted. The log entry also lists a client, Client="104". The latter identifies the client from which the record was inserted. According to this example, all transactions are logged in the same list. However, in some cases efficiency may be increased by using a separate log for each table in the database. The log may also include an index that facilitates searching and look up in the log during the triggering process.

A second line in the log is an entry that indicates that an entry with RID="1002" has been deleted from the database. The time stamp has been increased by one, and Logstatus="0" indicates that this is a delete. Since the entire record is deleted it is not necessary to list any column entries for this occurrence. However, including the deleted values in the log makes it possible to establish which values were stored in the record prior to the delete. Consequently, the log lists the value "Sweater" and the client initiating the delete, Client="102". It should be noted that in principle it is only necessary to enter the columns or fields that receive new values in the database log, since previous values can be found in earlier log entries. However, the inclusion of all columns in the log entry, also those that are unchanged or deleted, may facilitate the ability to find the content of table row at any time in the past provided that logging was turned on at that time and the log has not been purged. If, on the other hand, only partial entries are made in the log it may become impossible to tell if values that are needed during synchronization have been purged such that a full instead of a partial synchronization becomes necessary. It may therefore be difficult to combine logging only of changed values and purging of old entries from the log.

Finally the record with RID="2003" has been updated. The first digit of the RID identifies a different table this time, namely a table that identifies an assignment or association of one PDA to a particular store. It will be noted that an update in a case like this includes two entries in the log corresponding to two database events. First the original database entry is deleted, as indicated by the Logstatus="0". That database entry indicated that PDA="102" was assigned to Store="D", assuming that stores are identified by one letter designations. As mentioned above, the fields indicating the values that were entered in the columns of this record do not have to be entered in the database log, but they are included here for clarity. Following the delete, a new record with the same RID is inserted in the table. This new entry has the same value in the PDA column, but the value in the log entry indicates that the value in the store column of this entry should be "F", identifying a different store.

While the log has been described above as one or more lists of database operations performed on records in the database, other alternatives are conceivable without departing from the scope of the invention. For example, a log could include a large number of "snapshots" of the state of the entire database each time a client is synchronized, or even each time a database operation is performed. Such a method of logging may be impractical based on current limitations on resources such as memory and processing power, but it could be designed to fulfill the necessary requirements, which is to capture all relevant changes to the database between consecutive synchronizations of a given client.

Traditionally, incremental synchronization based on logs has been based on a simple examination of synchronization logs in order to determine which changes have been made to a database and to transfer all relevant changes to a client during synchronization. Filters have been used to determine which changes are relevant to a given client. However, in databases where filtering is performed on a table that is referred to by foreign keys in other tables, necessary updates may be excluded and foreign key constraints may no longer be fulfilled, as can be illustrated in the following example.

Consider a situation where during time window $\Delta t_{i-1}$ a new record of record type store is added to the database. There is a foreign key constraint between record type store and record type product, and ten new records of record type product are also added. The new products are part of the inventory of the new store.

Assuming that during synchronization of a particular client at the end of the time window $\Delta t_{i-1}$, i.e. based on the database $\Delta$ corresponding to $\Delta t_{i-1}$, the filters relevant to that client prevents the new store and products from being inserted into the partial database present on the client. If updates are done at the server database during $\Delta t_i$ that changes the database into a state where the new store and products would pass through the relevant client filters, but where no changes have been made to the values stored in the store and product records, there will be no entry in the database $\Delta$ for the interval $\Delta t_i$ indicating any change to those records, and consequently they will not be transferred to the client when the client is synchronized with the server at the end of the interval $\Delta t_i$.

In order to handle synchronization of partial databases where acceptance for a given record is allowed to change independent of whether the record itself has been changed, the present invention performs updates based not only on a database $\Delta$, as determined by a log, but also introduces the concept of a triggered $\Delta$, where records that are not part of the database $\Delta$ are included if they are triggered by a record that is part of the database $\Delta$.

In some embodiments of the invention, records may have their acceptance changed as a result of external variables. An example of an external variable may be a date or a time. For example, it may not be desirable to make work orders available on a client until the day before they should be handled. Consequently it may be necessary to browse through all work orders in order to identify all such orders that were denied in the previous synchronization, but accepted this time. Records that have their acceptance changed because of external variables may in turn trigger additional records.

Finally, triggered records may recursively trigger additional records.

The concept of triggering will be discussed in further detail, but attention will first be directed towards the relationships between record types and the various roles record types can have relative to each other. While the explicit definition of roles is not essential to all embodiments of the invention, definition of roles may facilitate proper inclusion of tables in the triggered $\Delta$ in complex databases. As such, an implementation of the invention may therefore include a subset of the roles described herein, all the roles described, or even a superset of the roles defined herein, since definition of additional roles as a result of design criteria and need in a particular embodiment are open to design choices.

FIG. 3 shows an example with tables and how they can relate to each other. Relationships between tables, or record types, are well understood by those with skill in the art. Relationships are used when an item (or record) in one table relates to one or more items in a different table. Relationships can be one-to-one, one-to-many or many-to-many. An example of a one-to-one relationship is "spouse". A married man has only one wife, and that wife has only one husband. An example of a one-to-many relationship is that of gender. The terms male and female will apply to many people, but each person can be only one or the other. A many-to-many relationship can for example be that between books and authors. A book can have more than one author, and an author can have written more than one book. These different types of relationships are handled in the same manner according to the invention, and without loss of generality it will not be specified whether a particular relationship described is one-to-one, one-to-many, or many-to-many.

The example of FIG. 3 is based on a relational database implementation. In a relational database, record types are represented as tables and records are rows of the tables. In the examples described below, the phrase "table" can be generalized to "record type" and "row" can be generalized to "record", and conversely "record type" can be "exemplified" by "table" and "record" by "row". No limitation in the scope of the invention should be inferred from which term is used in the various examples.

In the context of the present invention, user defined acceptance methods can be used to determine whether a particular row in a table should be transferred to a client or not. Because of the relationship between tables, it will often not be sufficient to transfer the record that has been changed, or that has had its acceptance changed by a method acting directly on that particular table. It may in addition be necessary to transfer or update rows from other tables that have a relationship with the row in question. For example, if a particular author is added to the selection of a bookstore and hence to a client computer associated with that bookstore, it may become necessary to transfer to that client not only the row representing that author, but also the rows that represent the books written by that author. Similarly, if a work order has its acceptance changed because it is due to be performed on the following day, it may also become necessary to transfer certain tasks from a table of tasks. The concept of roles is introduced in order to describe how acceptance rules take relationships into consideration.

The various roles that have been defined reflect the relationship between different tables or record types, and make it possible to define rules and trigger methods that trigger the correct updates when a client is synchronized. The various roles can depend on the way tables relate to each other, on whether their acceptance depend on declared acceptance methods and on parameters found in other tables, and on explicit declarations. FIG. 3 illustrates this in terms of an example.

A first table 301 will be referred to as the store owner table. This table may simply hold a list of store owners, and each store in the database will refer to an owner in the owner table 301. It should be noted that this table has no role in the present example. Only tables that are directly or indirectly associated with an acceptance method have roles. In the present example there are no acceptance method associated with the store owner table 301.

A second table is, in this particular example, a store table 302. The store table, as the name implies, is a table where each row represents a particular store. In this example the store table 302 will be the table with an associated acceptance method. This means that when a client is synchronized with the database, data may or may not be sent to the client depending on whether a given store is accepted or stopped by a filter for that client. The table the acceptance method acts upon will be referred to as a mother table. So mother is the role of a record type that an acceptance method works on directly. The acceptance method does not work on higher level record types like store owner 301. The acceptance method does, however, indirectly work on record types in the sub tree of the record type with which it is directly associated.

A third table 303 is a table holding parameters upon which the acceptance of the store table 302 is based. In this example table 303 is referred to as a PDA table 303 holding a list of PDA client computers and which store each listed PDA is assigned to. An acceptance method can, however, also work directly on parameters stored in the table on which it operates. For example the store table 302 could hold a value representing which PDA is assigned to the store, and the an acceptance method could be designed to accept the row (i.e. that store) when that PDA is synchronized.

The PDA record type of table 303 is a child with respect to the store record type, and it is also a parameter holder. Consistent with principles of the invention, parameter holders may also be unrelated (i.e. they do not have to be a child to the record types they act as parameters to. In such a case the parameter holder may have the same effect on all rows in a table. Thus, a parameter holder may for example act to turn a table on or off with respect to acceptance. Of course, the acceptance method could take additional parameters, so acceptance still does not have to be the same for all rows of the table.

A fourth table will be referred to as a Store_Product table 304. The store_product table 304 may for example contain information regarding which products are in stock in the various stores in the store table 302 at any particular time, and also how many items of each product each store holds.

It would, of course, be inconvenient to enter the same product several times, once for each store. Consequently, each product is listed only once in a separate table referred to as a product table 305. This brings the database into what is known as Second Normal Form.

The store_product record type of table 304 is, like the PDA record type of table 303, a child with respect to the store record type of table 302. Furthermore, the store_product record type is a son with respect to the record type article of table 305, and conversely the article record type of table 305 is a father relative to the store_product record type. It should be noted that the product table 305 could be sent to the client in its entirety. A table that is not restricted is not a father according to the terminology adopted in this exemplary embodiment. Instead, a father must be declared. A father that is declared is restricted by its son, which in turn is restricted by its mother. According to a first embodiment of the invention, a record is accepted by default if it has no acceptance method associated with it and it is not restricted by related records. In other embodiments default may be that records are not accepted unless they are explicitly accepted by an acceptance method or by being triggered by a related record.

An additional table called Product Total 306 is also defined. Product total may for example store the total sales for each product stored in the product table 305. The product total 306 is a non-restrictive subset member of product 305, and is defined as having the role of sister. Since database occurrence changes in the son, in this case in store_article 304, impacts the sister, the son also plays the role of brother to the sister.

Also shown in FIG. 3 are two additional tables referred to as Sale 307 and Purchase 308. The sale table 307 may for example store each sale made in a store, and the purchase table 308 may store each purchase made to resupply a store with a product. The record types of these tables play the role of child to the store_product record type of table 304.

Acceptance is determined by examining relevant values in the log. An entry for a particular record, or table row, will be referred to as an instance of that record or row. When synchronizing, two sets of values are of interest, namely the values stored in a record at or just prior to the beginning of a period $\Delta t$, and the corresponding values at or just prior to the end of $\Delta t$. These values can in most cases be found as the latest log entry for that record prior to the beginning of a period $\Delta t$ and the latest log entry for the same record inside the period $\Delta t$. These two instances will be referred to as a pair.

Consistent with the principles of the invention, two different issues may be considered. The first issue is to determine the acceptance for the instances in a pair. The other issue is to determine whether, based on acceptance of the two instances, the pair should update the client. While the term acceptance will refer to whether a particular instance (i.e. a particular set of record values associated with a particular point in time) was or should be present on a client, the determination of whether a pair should update a client will be referred to as filtering. If a pair passes through a filter, or if a filter returns 'true' for a pair, the pair should update a client. The fact that a pair passes through a filter may mean that a new record is inserted, that an existing record is updated with new values, or that an existing record is deleted from the client. Acceptance for an instance is determined by determining whether the instance is restricted by any other record type instance that is not accepted (e.g. whether a child is a child of a mother which is not accepted), or whether acceptance is determined by a user defined acceptance method. The values that are examined by a user defined acceptance method are the values of the instance that are defined as parameters for that acceptance method.

When determining whether a pair passes through the filter, acceptance for the two instances may be determined. Consistent with the principles of the present invention, the outcome of the determination made by the filter may be based on a determination of at least one of the following: 1) was the record accepted in the client at or just before the start of Δt, and 2) was the record accepted in the client at or just before the end of Δt.

The above two questions can result in four different outcomes. If both questions are answered in the negative, the record was not accepted at the previous synchronization and it should not be accepted now. Consequently, the pair does not have to pass through the filter. If the answer to the first question is yes and the answer to the second question is no the record was accepted, and is presumably already present on the client, but it should no longer be accepted. Hence the entry already present on the client should be removed, and the acceptance change means the record should be deleted (DEL) from the client. In order to perform this task, the pair must be allowed to pass through the filter. Conversely, if the answer to the first question is no and the answer to the second question is yes, the record may have to be inserted in the client database (INS). Again it will have to pass through the filter. Finally, if both questions can be answered in the affirmative, any change to the values of the record on the server is also relevant to the client, and the pair should pass through the filter. Exactly how this process can be handled in embodiments of the invention will be described in further detail below.

In some cases, acceptance can be determined for a mother based on parameters found in rows of a different table. Such a table will be referred to as a parameter holder, exemplified in FIG. 3 by the PDA table 303. Acceptance determined from parameters stored in other tables will be referred to as parameter based acceptance of a mother.

For records that have no associated acceptance method, acceptance can be determined by examining other records. For example, in order to determine acceptance for a row in the purchase table 308, acceptance must be determined for the referenced row in the store_product table 304. If the row in the purchase table is subject to e.g. a foreign key constraint (i.e. if there is a foreign key reference in the purchase row that references a store_product), the purchase can only be accepted in the client if the referenced store_product row is accepted. Otherwise, referential integrity would not be fulfilled. Since there is no acceptance method defined for the store_product table 304, a similar determination must be made by examining the row in the store table 302 referenced by the row in the store_product table 304. Consequently it may be necessary to make recursive look ups in the log. The efficiency of searching the log may be increased by indexing the log, and by segmenting the log into separate log segments for each table.

The concept of roles facilitates the definition of rules regarding how and when occurrences that have not been changed should be triggered as a result of other changes to the database. In order to maintain the correct partial database on a client, all the records that should or should not be on the client should be properly synchronized, while fulfilling all constraints. Records that have an acceptance method associated with them, the mother records, are the records that in combination define the scope of the partial database on a client, since acceptance for a record that is not associated with an acceptance method depends on its relationship with a table with and acceptance method, i.e. a mother.

If the acceptance has changed for a record with an acceptance method, i.e. a mother, this should trigger all her children, i.e. all records of the mother's subtree. It should be noted that the log does not directly provide an answer to whether a record, such as a table row, was accepted by any given client at any particular point in time. If the record has an acceptance method, it can be determined by examining the logged value or values that are parameters to the method, either in the values of the row representing this record itself, or in a parameter holder table. If the record does not have an acceptance method, acceptance must be determined for this records mother.

In the example illustrated in FIG. 3, the mother table may be accepted based on parameters stored in the PDA table 303. If an acceptance method operating on the store table 302 with parameters fetched from the PDA table 303 determines that because of a change made to an entry in the PDA table 303, a particular record occurrence from the store table 302 should now be accepted in a particular PDA, it becomes necessary to add not only the relevant store from the store table 302, but also all relevant rows from the subtree of tables such at all database constraints can be fulfilled. Typically this means that all store_products entered in table 304 as products referring to a store that is no longer accepted, can also no longer be accepted in order to maintain referential integrity. Similarly, store_products that reference a store that is now accepted in the client, should also be accepted. Furthermore, all descriptions of these products found in the product table 305 should also be entered. According to some embodiments of the invention, entries in a table like the product table 305, referred to as a father table, can be accepted based on the references made from the referring son table, in this case the store_product table 304. It should be noted that according to the terminology adopted in this specification, a father table cannot have an acceptance method associated with it. If it did it would be a mother table.

Furthermore, the children of the store_product table 304, the sale table 307 and the purchase table 308 should also be added to the client (or removed as the case may be), and also the item total table 306.

In the triggering process, the parameter holder occurrences trigger rows of the mother table store, the triggered rows in the store table trigger rows in the child tablestore_product, and the triggered rows of the store_product table trigger their own children in the sale and purchase tables.

It should be noted that while this example assumes that the mother table has its acceptance determined based on parameters in a parameter holder table, the table could also be filtered based only on content in the table itself. For example, the store table 302 could have a column called PDA, and the particular PDA entered in this column could determine whether a record should be accepted on a client or not.

Attention will now be directed to the concept of triggering. As has already been mentioned, triggering does not have to depend on changes having been made to a record. Records may also be included in the triggered Δ because of a change in acceptance. A triggered occurrence is a pair representing a record which has not been changed during the time period Δt, but which has had its acceptance changed for the client currently being synchronized.

Figure 4A:
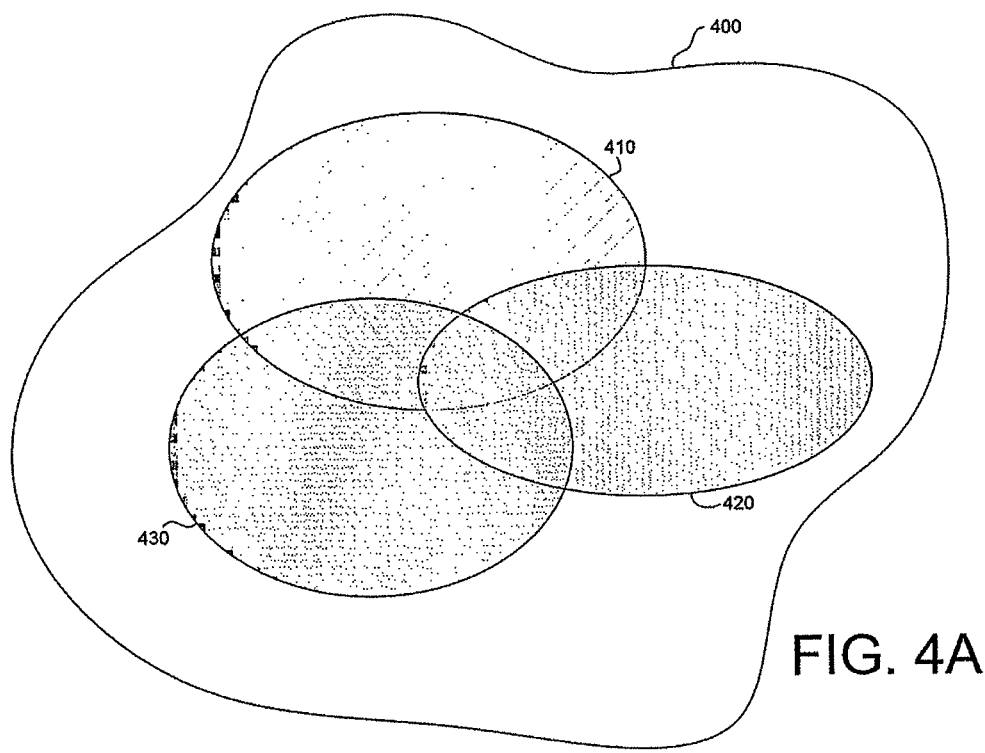
FIG. 4 is a diagram illustrating how different parts of a database may be relevant to synchronization of a client for different reasons.

Reference is now made to FIG. 4 which illustrates the different relevant parts of a database during incremental synchronization in accordance with the invention. In FIG. 4A the entire scope of a database is illustrated as an area 400. A first subset 410 of the database 400 represents data records (e.g. table rows) that have been changed between two consecutive synchronizations. This is what has been referred to as the database Δ. A second subset 420 of the database 400 represents records that have had their acceptance changed as a result of an external variable. Finally, a third subset of the database 430 represents records that are triggered by other records, i.e. records that have their acceptance changed as a result of changes in other records.

Figure 4B:
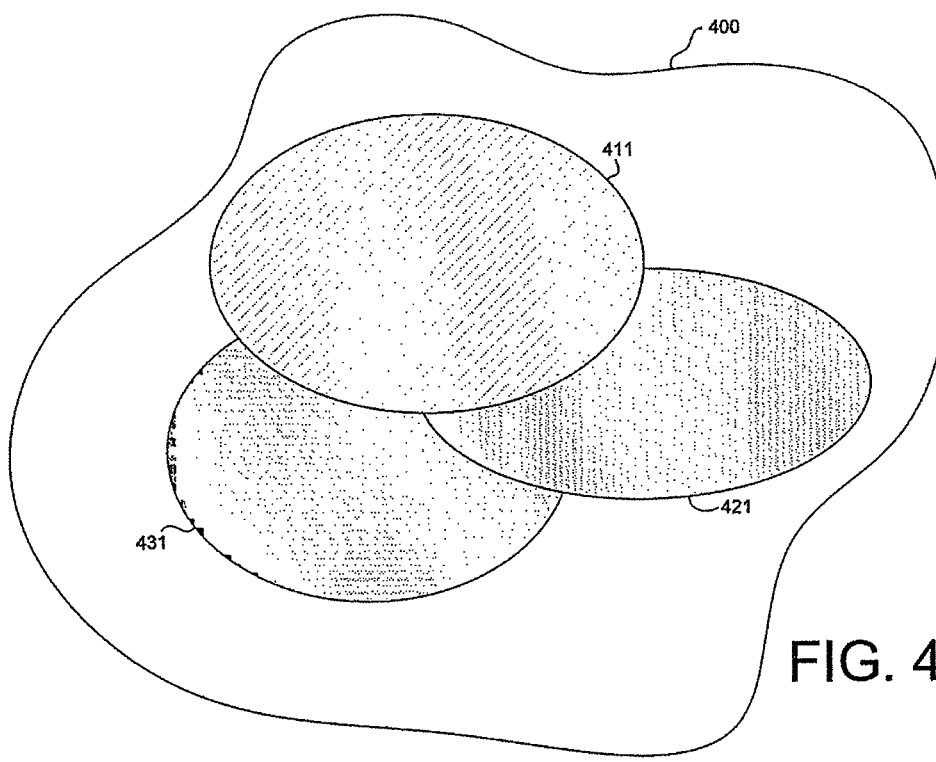

It will be realized that these sets can overlap. For example, a work order may have been entered prior to the first synchronization when it is not accepted, it is changed before the following synchronization and thus belongs to subset 410, and it also becomes acceptable to a client as a result of an external variable. Similarly, a child that is triggered by a mother, and thus belongs to subset 430, may also have been changed so that it also belongs to subset 410. However, it may be inconvenient to process the same record several times. Hence, as shown in FIG. 4B, in some embodiments of the invention the database Δ is defined as all records that have changed 411, records collected because they are subject to an external variable are collected in subset 421 only if they are not already part of the database Δ, and records are only triggered by other records and included in subset 431 if they are unchanged (i.e. not in subset 411) and not subject to an acceptance change from an external variable (i.e. in subset 421).

Figure 5:
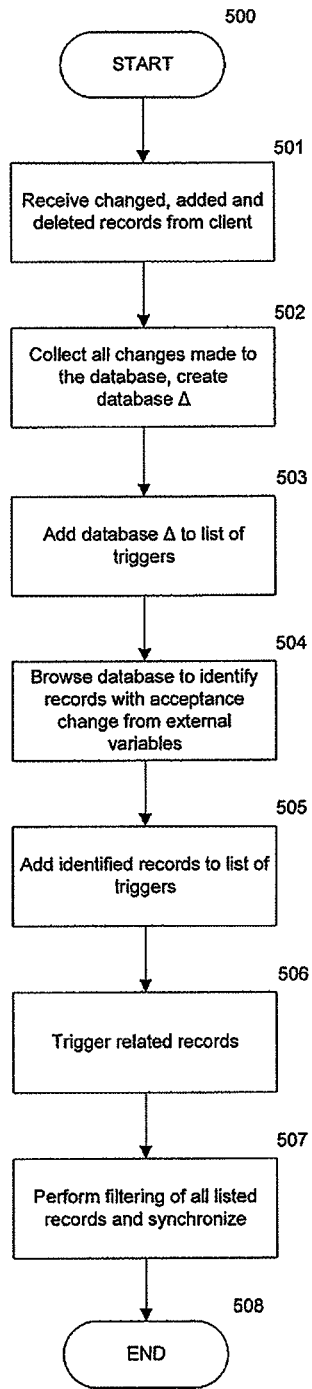
FIG. 5 is a flowchart illustrating a method of synchronization according to the invention.

Reference is now made to FIG. 5 which illustrates in a flow chart how a method according to the present invention can proceed. The process starts in an initial step 500. Then, in a next step 501, all changes, inserts or deletions made on the synchronizing client may be received. These can then be applied to the database and included in the database log prior to the start of the synchronization. As has already been mentioned, changes received from a client will normally not be returned to the client during synchronization, but there can be exceptions to this rule.

The process then moves on to step 502, where all changes made in the database are collected. This process creates the database Δ, shown as subset 411 in FIG. 4B. The collected changes are added to a list of triggers in a step 503. Although the invention is not limited in this respect, the changes can be entered as pairs in the list of triggers, as will be described in further detail below. In some embodiments the changes may also be entered only once, for example can inserted or deleted records be entered only as one INS or one DEL entry in the list of triggers.

Next, in a step 504, the database is browsed in order to identify records which have had their acceptance changed from external variables. Examples may include records that have their acceptance changed at a certain point in time, as discussed above. These changes, which are part of the acceptance Δ shown as subset 421 in FIG. 4B, are added to the list of triggers, as shown in step 505.

In step 506, the entries in the list of triggers will trigger related pairs and they will be investigated for acceptance change. Triggered pairs, corresponding to the subset 431 of FIG. 4B, will be added to the list of triggers and the process continues recursively until there are no new triggers in the list of triggers. This process will be described further with reference to FIG. 6 below.

When the process of triggering is complete, filtering is performed for all pairs in the list of triggers and the actual synchronization commences in step 507. The method then terminates in step 508.

It should be understood that while the method discussed above with reference to FIG. 5 has been described as a sequence of distinct steps, the particular sequence of steps described is only one possibility that has been chosen for ease of understanding. For example, the steps of collecting changes from the database log in step 502 and the step of adding the collected changes to a list of triggers are described as two consecutive steps. However, the changes may be entered into the list as they are collected such that each time a change is found in the database log it may be recorded in the list of triggers before the method moves on to locate the next change in the database log. Also, it is not necessary to collect all changes before triggering. It may for example be desired to transmit data to the client in smaller chunks, and in order to achieve this a predetermined number of changed pairs from the database Δ can be used to trigger all relevant pairs of their respective subtrees, and synchronize these pairs before moving on to the next predetermined number of triggers. Thus, at the one extreme it is possible to collect the first changed pair, to find all pairs triggered by this first changed pair, perform filtering and transfer relevant changes to the client before moving on to the next changed pair in the database Δ. At the other extreme, all changes are collected first, then everything is triggered based on all the collected changes, then filtering is performed for all collected and triggered pairs, and finally all relevant updates are transferred to the client.

Also, the steps of identifying records changed by external variables 504 and adding them to the list of triggers can be performed before collection of changed records.

The various steps of FIG. 5 will now be discussed in further detail.

The step of receiving, at the server database, all changes made at the client while the client has been disconnected from the server, makes it possible to handle all changes made to the database from any client at any time.

The records that are received from the client in step 501 are collected at the client in a process similar to the process for collecting changed records and build the database Δ on the server. However, since all records exist on the server and all changes should be sent to the server, it is not necessary to filter the records, and hence it is also not necessary to identify triggered occurrences. The client simply sends its entire database Δ to the server.

After receipt of the records from the client, they can be inserted into, deleted from or updated on the database. These insertions and updates are treated as any other interaction with the database, and entered in the log of the database. As already noted, the updates received from a particular client is normally not sent back to that client, but exceptions can be required in certain situations.

In step 502, changes made to the database in the period Δt are collected. This can be performed by a method or subroutine which is part of the DBMS. This method will be referred to as CollectRecords. The CollectRecords method examines the log for the period Δt in order to discover all records with different values at $t_0$ and $t_1$, where $t_0$ refers to the point in time for the previous synchronization of this particular client and $t_1$ refers to the point in time for this synchronization. In other words, Δt represents the period of time from $t_0$ to $t_1$. All records identified as having different values at $t_0$ and $t_1$ are added to a list of triggers. It should be noted that it is not necessary to add records that have changed several times during the period Δt if all values at $t_1$ have returned to the values they had at $t_0$. Consistent with principles of the invention, records are added as pairs to the list of triggers, one instance of the pair representing the record at time $t_0$ and the other instance representing the record at time $t_1$. In a first embodiment, all values of the record are included in both instances of the pair. In an alternative embodiment all values are included in one of the instances, while only the differences are included in the other record. In yet another alternative, both instances only include the values that have changed. In principle it is also possible to only include the updated values for time $t_1$ in the list of triggers, since if earlier values should be required they can be located by going back to the log.

The changes collected in step 502 and entered in a list of triggers in step 503 represent the database Δ. According to a first embodiment, all records belonging to the database Δ are added to the list of triggers by the method CollectRecords, whether or not they are relevant to the particular client being synchronized and acceptance is determined during the process of triggering and/or only during the final synchronization. It is, however, consistent with the principles of the invention to determine acceptance for the instances of each pair in the database Δ and only add the pair to the list of triggers if it's acceptance or acceptance change is relevant to the client.

The step 504 of browsing the database to identify records that have not changed any value during Δt, but have had their acceptance changed due to some external reason, and the entry of such identified records as pairs to the list of triggers in step 505 can be performed by a method or subroutine that can be part of the DBMS, and that will be referred to as BrowseExternalAcceptanceChange. This method identifies records that have had their acceptance changed relative to the client that is synchronized (or alternatively to any client) as a result of some determining factor that is external to the database itself, for example as a result of the passing of time. In order to identify records whose acceptance have changed since the previous synchronization, it is necessary to know the status of value of the external variable at the previous synchronization. It will be realized that this value may not be directly available from the log, since the log by definition tracks changes to internal database values. It may therefore be necessary to keep track of such external values for example in a separate log, and this may be done for all records that have types that are associated with an external acceptance method.

Since records identified by this method are added as pairs to the same list of triggers as those of the database Δ, it is not necessary to identify records that already have been added to the list of triggers because they have had their values changed during Δt. Consequently, according to a first aspect of the invention this method only identifies records that have been unchanged during Δt but have had their acceptance changed. Alternatively, the method identifies all records that have had their acceptance changed for external reasons, and adds them as pairs to the list of triggers. In this case it may be necessary to remove duplicates from the list of triggers in order to avoid multiple triggering on the same record.

It should be understood that the BrowseExternalAcceptanceChange method can also be performed prior to the CollectRecords method, in which case the CollectRecords method may be configured to only include records that have had at least one value changed and has not had its acceptance changed, since the latter will already exist in the list of triggers.

Records that are identified by the BrowseExternalAcceptanceChange can be added to the list of triggers as an update (UPD) with the same values entered for $t_0$ and $t_1$. It is, however, consistent with the principles of the invention to enter the record only once (as a "half" pair) with only an insert (INS) or delete (DEL) for $t_1$.

The process now moves on to step 506 where pairs that should be triggered by the pairs listed in the list of triggers, i.e. pairs that may have to be transferred to the client (or deleted from the client) as an indirect result of the pairs that are listed in the list of triggers. Such records can be referred to as triggered pairs, or triggered occurrences, and the method used to identify them will be referred to as TriggerOnRecords.

According to aspects of the invention, a triggered occurrence can be a pair that has been unchanged during Δt, as the case is with the records identified by the BrowseExternalAcceptanceChange method, but has had its acceptance changed for some client as a result of changes to values or acceptance for other records, i.e. as a result of entries in the list of triggers. The process of identifying such records will be referred to as triggering, and the records identified will be referred to as triggered pairs or triggered occurrences.

Pairs that have not changed their value during Δt but are added to the list of triggers either because of an external variable or because they are triggered, can be added to the list of triggers as updates (UPD) with the same values for both instances of the pair. The invention is not limited to this alternative, since all information can be retrieved from the log at any time, but adding unchanged records as updates may in some embodiments make it possible to reuse methods that are designed for the pairs from the database Δ. This will be realized by considering the following. When determining filter status in step 507 for the pairs from the database Δ, any pair that collected as a result of a DEL (i.e. a record that existed in the server database at $t_0$ but was deleted before $t_1$) should either be deleted from the client at the $t_1$ synchronization, if it was accepted at $t_0$, or it does not exist at the client in the first place because it was not accepted at $t_0$ and it can be ignored during synchronization at $t_1$. Similarly, any pair that is collected as a new INS did not exist in the database at $t_0$ but it does at $t_1$, which means that it should either be inserted in the client (if it is accepted at $t_1$) or it can be ignored (if it is not accepted at $t_1$).

However, if a pair from the database Δ is listed as an UPD, this means that the record may have existed at $t_0$ (it may also have been added after $t_0$ and then updated), it still exists at $t_1$, but its value has changed during Δt. How it should be treated during synchronization depends on the following. If it was accepted at $t_0$ and is still accepted at $t_1$, it should be treated as an update (UPD). If it was not accepted at $t_0$ and is still not accepted at $t_1$, it can be ignored. However, if it was not accepted at $t_0$ but its acceptance has changed during Δt so it is accepted at $t_1$, it must be changed to an insert (INS) since it is not already present on the client. Similarly, if acceptance for the instances in a pair have changed from yes for the first instance to no for the last instance, the record should not be updated on the client it should be removed, which means it should change to a DEL. Since only pairs that are listed as UPD in the list of triggers change in this manner, and since triggered records must have their acceptance determined in the same way, it may be convenient to enter triggered records as updates in the list of triggers.

Figure 6:
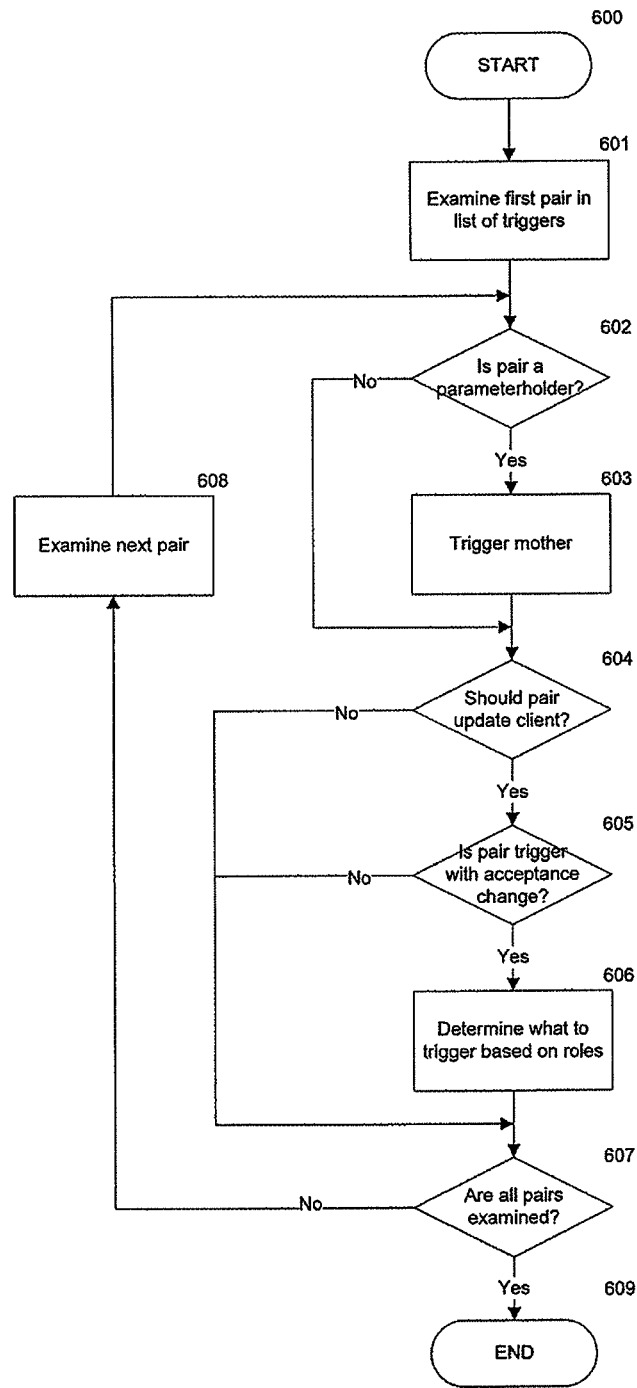
FIG. 6 is a flowchart illustrating a method of identifying database entries that are candidates for updating a client during synchronization.

Turning now to FIG. 6, the process of triggering performed in step 506 will be described in further detail. This process corresponds to step 506 in FIG. 5, and reference will also be made back to FIG. 3 where the various roles are exemplified. It should be noted that the terms used to refer to the various roles are adopted for convenience, and are not intended to represent any limitation to the invention. For example, the gender associated with a role is not relevant, and a record type can have several roles of different gender. For example, a record type may be both a mother and a son. A different terminology could readily be adopted in order to adequately describe the invention.

The process of triggering can be handled by a method or subroutine that may be part of the DBMS and which will be referred to as TriggerOnRecords. The TriggerOnRecords method takes the list of triggers created in the previous steps as its input when it commences in a first step 600.

In a first step 601, the first pair in the list of triggers is examined. It should be remembered that while the very first pair examined either comes from the database Δ or is included in the list as a result of an external variable (depending on implementation), in general, triggers may themselves have been triggered as part of the process outlined here with reference to FIG. 6.

In a next step 602 it is determined whether the pair in the list of triggers currently being examined is from a table of parameter holders, such as for example the PDA table 303 in FIG. 3. If this is the case, the process moves on to step 603 where the mother is triggered. As explained with reference to FIG. 3 a record type with an associated acceptance method is always a mother, and since parameter holders are input parameters for acceptance methods, they will always trigger the filtered record type, i.e. a mother.

The reason why this is the case can readily be understood from the example in FIG. 3. If the parameter holder is a list of associations between PDAs and the stores the PDAs are assigned to, a change in such association will obviously impact which data the PDA should receive when it is synchronized with the database. Triggering the mother means that at least one identified record from the mother table 302 is added as a pair to a list of triggered records. The triggered pair can be added to the list of triggers, but the column values will be the same for the two instances in the pair, since the values have not changed during Δt. (If the mother has actually been changed during Δt it will already be part of the list of triggers, and it is not necessary to add it to the list of triggered occurrences.)

It should be noted that it may be necessary to add more than one record from the mother table to the triggered list. If, for example, a PDA was assigned to a first store STORE01 at $t_0$ and has been reassigned to a second store STORE02 at time $t_1$, as indicated by a change in the parameter holder, it may be necessary to delete STORE01 from the client and to add STORE02. Consequently, STORE01 and STORE02 should both be triggered and added as UPD to the list of triggers. During step 507 of FIG. 5 it can then be determined that STORE01 should be changed to DEL and STORE02 should be changed to an INS, respectively. It should be noted that in order to maintain data integrity, it may be necessary to delete records that are no longer accepted for a given client from that client. However, it is consistent with certain embodiments of the invention to allow records to remain on a client if the database designer can ensure that this does not compromise the integrity of the data or the storage capacity of the client in an unacceptable manner.

The process of adding a mother record type can be handled by a method or subroutine which will be referred to here as AddMaterFamilias and which takes the pair from the parameter holder list as its input parameter. As mentioned above, AddMaterFamilias may trigger one or more pairs from a table. For example, one record that was accepted because of the values of the first instance in the parameter holder pair is no longer accepted because of the values of the last instance in the parameter holder pair, and conversely a different record was not accepted for the first instance, but is now accepted.

Both will be added to the list of triggers as two UPD pairs, and they will be changed to DEL and INS, respectively, before the updates are transferred to the client.

After the mother pair or pairs have been added as one or more triggered pairs to the list of triggers, the process moves on to step 604. Similarly, if it was determined in step 602 that the trigger pair is not a parameter holder, the process moves directly to step 604 without triggering a mother record type.

In step 604 the pair under consideration is further examined in order to determine whether the pair should update the client, i.e. whether the pair should pass through an update filter. This determination can be made based on determination of the acceptance for the instances of the pair with respect to the client being synchronized. This determination can be made using the same method as the one used to determine whether a triggered pair should update the client in step 507 of FIG. 5. This method will be described in further detail below with reference to FIG. 7.

The determination of acceptance made in step 604 may have the following consequences. If neither of the instances of the pair are accepted, the pair will not update the client it is therefore not necessary to trigger additional pairs based on this pair, and the process moves on to step 607. If, however, at least one of the instances are accepted, the pair may require changes on the client, and the pair should trigger further. This is because the filtering of the pair does not determine whether the record should be present on the client, but whether the pair represents a change that is relevant to the client.

If it is determined in step 604 that the record does pass through filters and thus that it should update the client, it should also be determined in a following step 605 whether the pair is a trigger with acceptance change. If it is determined that there is no change in acceptance for the pair, there is no need for further triggering. The pair may still update the client, but it does not trigger other record types and the process moves on to step 607. The reason is that since acceptance has not been changed, any changes are to the values stored in the record itself and the client can be correctly updated by updating any changed values in this record. These changes do not restrict any records in this records subtree.

If it is determined that the acceptance for the pair has changed, however, the process moves on to step 606 where it is determined, based on the roles of the record, which other record types need to be triggered and added to the list of triggers. Triggering based on roles will be described in further detail below. After triggering based on roles has been completed for this trigger, the process moves on to step 607.

In step 607 it is determined whether the pair that has just been processed was the last pair in the list of triggers. If this is not the case, the process moves on to the next pair in step 608, and the same process is repeated. This continues until it is determined in step 607 that all triggers have been examined and the process terminates in step 609.

In alternative embodiments of the invention, the two steps 604 and 605 can be processed differently. For example, step 605 can be performed before step 604.

Returning again to FIG. 5, when all triggering is completed in step 506, filter status for all pairs in the list of triggers must be determined in step 507. The same procedure may be used as in step 604 in FIG. 6 when it is determined if the pair should update the client, a procedure that is explained in further detail below with reference to FIG. 7. There is one, however, one difference between the method performed during triggering in step 604 and the method performed during synchronization in step 507. It will be recalled that records are only irrelevant to the synchronization process if their acceptance is false for both instances of the pair. It will also be recalled that if the pair was added to the list as a DEL or an INS, i.e. that the change to the record in the database was a delete or an insert, the record should be deleted from or inserted into the client, respectively. However, if the pair has been added to the list as an UPD, additional considerations become necessary. This was briefly discussed above when it was explained why triggered pairs may be added to the list as UPD. The result of these additional considerations is that pairs that have been added as an UPD may have to be changed to INS or DEL. This may not have to be performed during triggering in step 604, only during synchronization in step 507.

The following code illustrates filtering of pairs, where it may be determined whether a record should be inserted, deleted or updated on a client. The code fulfills two tasks. The first task is to determine whether or not a pair should update a client, represented by the return of 'true' if it should and 'false' if it should not. The other task is to change UPD to either INS or DEL if necessary.

```
AcceptFirst = OnRT_Accept(first) And OnRT_AcceptFather(first)
AcceptLast = OnRT_Accept(last) And OnRT_AcceptFather(last)
Select Case DMLOf(First.TS_Logstatus, Last.TS_Logstatus)
    Case DMLIndex.INS
        Return AcceptLast
    Case DMLIndex.DEL
        Return AcceptFirst
    Case DMLIndex.UPD
        If AcceptFirst And AcceptLast Then
            Return True
        ElseIf AcceptFirst And (Not AcceptLast) Then
            First.Logstatus=DEL
            Last.Logstatus=DEL
            Return True
        ElseIf (Not AcceptFirst) And AcceptLast Then
            First.Logstatus=INS
            Last.Logstatus=INS
            Return True
        ElseIf (Not AcceptFirst) And (Not AcceptLast) Then
            Return False
        End If
End Select
```

Figure 7A:
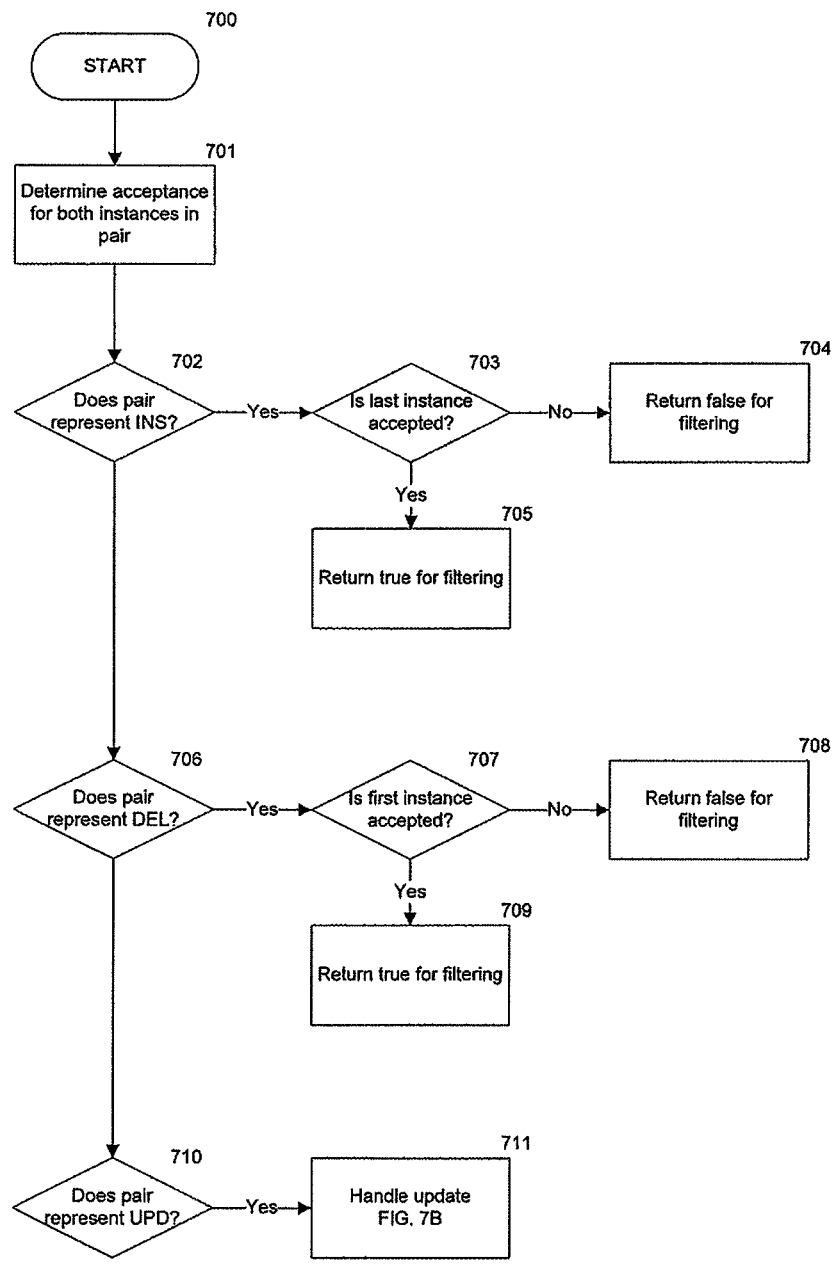
FIG. 7 is a flowchart illustrating a method of determining if an identified database entry should update a client and for finding an appropriate database command for the update.

FIG. 7 illustrates the method performed by the exemplary code listed above. The method starts in initiating step 700 in FIG. 7A and progresses to step 701 where acceptance is determined for the first and the last instance in the pair. If the pair represents a mother or a child, acceptance can be determined by the method described with reference to FIG. 8 below. If the pair represents a father, acceptance can be determined by the method described below with reference to FIG. 9. According to some embodiments of the invention, rather than first determining the role of the pair's record type, both methods are performed, and both should result in positive acceptance in order for the instance to have a positive acceptance.

The method then moves on to determine if the pair represents an INS command in step 702. If this is the case, and if the last instance in the pair is not accepted, as determined in step 703, the method returns 'false' for the filtering of the pair in step 704. If the last instance is accepted, the method returns 'true' for filtering in step 705. This means that if the pair is listed as an INS and its acceptance for the last instance in the pair is true, it should pass the filter and be inserted on the client. If it is not accepted now, it is irrelevant, and the method returns 'false'. For convenience the pair may be represented by two identical instances. Alternatively, inserts can be represented as "half" pairs with only one instance, as a design choice.

If the pair is determined in step 706 to represent a DEL, the method proceeds to step 707. If it is determined in step 707 that the first instance in the pair was not accepted in the client, the method returns 'false' for filtering in step 708. Otherwise, the method returns 'true' 709. This means that if the pair is listed as a DEL and its acceptance for the first instance of the pair is true, it should already be present on the client, and it should be removed since it has been removed from the database on the server. Hence, DEL remains a delete. This example illustrates how an embodiment which enters only "half" pairs for DEL and INS cases would be sufficient, since the method of FIG. 7 only needs to consider one of the instances of the pair in these cases.

Figure 7B:
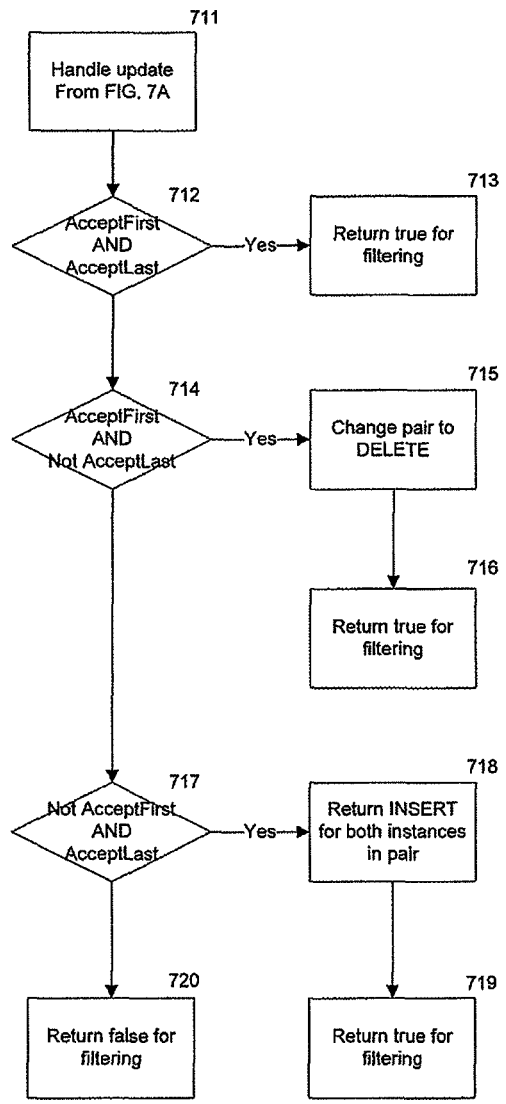

In the case that the pair is listed as an UPD, as determined in step 710, the update must be handled as illustrated in FIG. 7B, as indicated in step 711 which is represented in both FIG. 7A and FIG. 7B. The update is handled as follows. If it is determined in step 712 that both instances of the pair were accepted in the client, this means that the record is already present on the client and it should remain so. Hence, it is necessary to make the same update at the client as was done at the server, and the UPD is retained. The method returns in step 713 with 'true' for filtering; the pair should update the client. If it is determined in step 714 that the first instance in the pair was accepted, but the last instance is not accepted, this means that the record is present on the client, but it should no longer be so. Consequently, the pair is changed from UPDATE to DELETE in step 715 and the method returns with the filter value 'true' 716; the record is no longer accepted and the pair must pass through the filter to update the client accordingly. If it is determined in step 717 that the first instance in the pair was not accepted and that the last instance is accepted, the record is not present on the client and must be inserted. Consequently, in step 718 the pair is changed from UPDATE to INSERT and the method returns with the filter value 'true' 719. If neither of the instances are accepted, the method returns the filter value 'false' in step 720.

In some embodiments of the invention, the change of updates to deletes or inserts is not performed during triggering (step 604 of FIG. 6), only during synchronization (step 507 of FIG. 7). In alternative embodiments, however, the pair may be changed during triggering and changed in the list of triggers as part of the process in step 604 of FIG. 6. In the latter case it may be unnecessary to perform the change again during synchronization.

Figure 8:
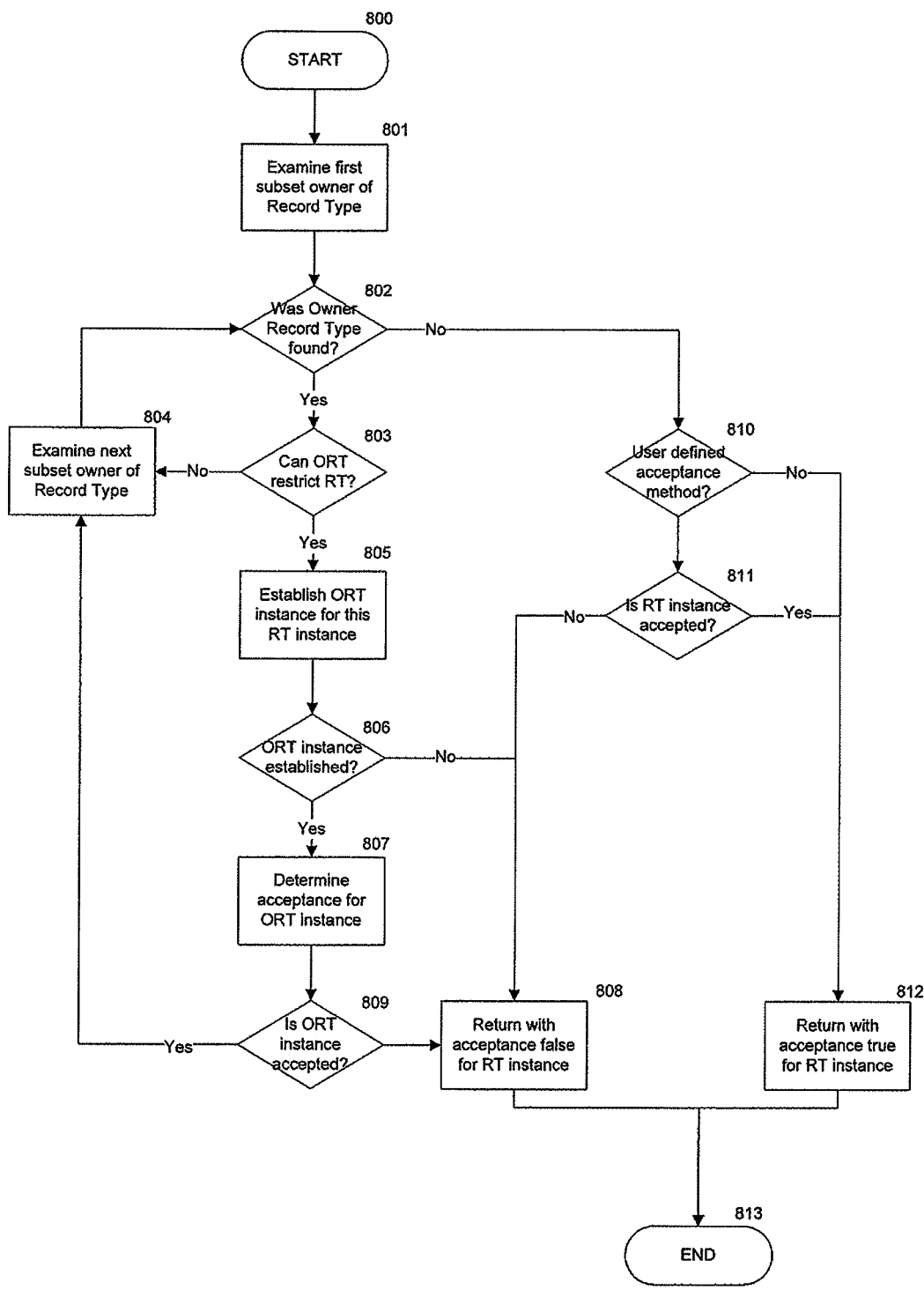
FIG. 8 is a flowchart illustrating determination of whether a database record of a first type is or was accepted in a client at a particular point in time.

The acceptance method will now be described in further detail with reference to FIG. 8 where the process for determining acceptance for an instance of a record type is illustrated. The acceptance method is the method called OnRT_Accept(instance) in the exemplary code listed above. Consistent with the principles of the invention, the basic principle of determining acceptance is that a record may be accepted unless it is part of the subset of a subset owner that itself is not accepted, or if it is explicitly not accepted by a user defined acceptance method. The former ensures that data integrity is maintained (no record is accepted if it includes a reference to another record that is not accepted), the latter may provide designers with the possibility to reduce the amount of data that is transferred to a client. As such, the method described with reference to FIG. 8 determines whether the record type instance that is examined is not accepted due to one of the reasons given above. If this is determined, acceptance for the instance is determined in the negative. Otherwise, the instance may be accepted.

Acceptance for record types with the father role may be determined somewhat differently, as will be discussed below.

It should be recalled that an instance of a record type represents the values stored in a particular record of a particular record type at a particular point in time, and that these values can be found from the log. The instance of a record type currently under examination by the acceptance method will be referred to as the Record Type Instance or RT Instance, and its record type will be referred to as the Record Type or RT. Furthermore, the instance examined by the acceptance method, the RT Instance, may relate to one or more subset owners. A subset owner is an instance of a different record type, referenced by the record type under consideration. The record type of a subset owner will be referred to as an Owner Record Type or ORT, and the particular instance of the owner record type will be referred to as Owner Record Type Instance or ORT Instance. The ORT Instance can be identified by the reference to it in the RT instance and the time stamp of the RT Instance in the log.

The process starts in an initiating step 800 and proceeds to step 801 where a first subset owner for the record type is identified. If it is determined in step 802 that no ORT is identified, the process moves on to step 810, which will be discussed below. If an ORT is identified the process moves on to step 803 where it is determined whether the identified ORT can restrict the record type under consideration. The RT is restricted by the ORT if the ORT itself can be absent from the client due to acceptance. If the ORT is not accepted at the client, the RT should not be accepted either, because this may violate restriction requirements (the RT could relate to an ORT that is absent from the client, which would compromise data integrity). Whether an Owner Record Type can restrict a Record Type can be determined by considering the role of the ORT. If the ORT is a mother or a child it can restrict the RT. Furthermore, the RT may also be restricted by the ORT if the ORT is a father or is itself restricted by a father (i.e. a sister). In this case the ORT may be referred to as an indirect mother. The process for determining if an Owner Record Type is an indirect mother will be described in further detail below.

If it is determined in step 803 that the ORT cannot restrict the RT, the process moves on to step 804 where the next ORT is identified. If, however, the ORT can restrict the RT, the particular ORT instance referenced by the RT instance is established in step 805. The ORT instance is established by first identifying its primary key from the foreign key referencing it in the RT instance and then scanning the log in order to find the values associated with this ORT instance at the appropriate time. The log is scanned backwards in order to determine the appropriate instance values at the beginning of the time window $\Delta t$ if the RT instance is the first instance in the pair, and at the end of the time window $\Delta t$ if the RT instance is the last instance in the pair. In step 806 a check is made to determine if the ORT instance was properly established. If it was not, which will be the case for example if the RT instance is the first instance in the pair and the corresponding RT record in the database was inserted during $\Delta t$ such that it did not exist and therefore had no ORT at the beginning of the time window, the process moves to step 808 where acceptance for the RT instance is set to false. If the ORT instance is properly created, however, the process proceeds to step 807 where acceptance is determined for the ORT instance.

If the ORT is a mother or a child, acceptance for the ORT instance can be determined in the same manner as for the RT instance. In other words, the method presently being described can be called recursively to determine acceptance of an ORT instance which may, of course, again depend on its own ORT instance.

If, however, the ORT is a father it may be restricted by its son, i.e. by a record type instance which is not its owner, but a part of its subset tree. If this is the case, a different method may be invoked, as will be described further below with reference to FIG. 9.

If it is determined in step 809 that the ORT instance is not accepted, the RT instance cannot be accepted, and the process moves on to step 808. If the ORT instance is accepted, however, the process moves on to step 804 in order to identify if there are additional subset owners upon which the acceptance of the RT instance depends. If this is the case, as determined in step 802, the process is repeated for this ORT. This continues until either an ORT instance results in a negative determination in step 806 or 809, in which case the process terminates in step 813 after acceptance is set to false in step 808, or until it is determined in step 802 that all ORTs have been examined without any negative determination of acceptance, in which case the process proceeds to step 810 to determine whether there are any user defined acceptance methods defined for the RT. If no user defined acceptance method has been defined, the RT Instance is not restricted by any ORT Instance and not by any user defined acceptance method, so the process proceeds to step 812 where acceptance is set to true before the method terminates in step 813. If a user defined acceptance method is defined and it is determined in step 811 that the RT instance is not accepted according to the user defined acceptance method, the process moves on to step 808 where acceptance for the RT instance is set to false and the method terminates in step 813. If it is determined in step 811 that the RT instance is accepted by the user defined acceptance method the process moves on to step 812 where acceptance for the RT instance is set to true before the method terminates in step 812.

The method discussed above with reference to FIG. 8 can be illustrated by returning to the example of FIG. 3. Consider for example whether an instance which is the first instance in a pair of the record type Purchase should be accepted by a PDA holding all data relating to a particular store in the Store table 302. When the method reaches step 801, the first ORT is determined to be the Store_Product table 304, and in step 803 it will be determined that because this record type is a child, it is capable of restricting the Purchase table 308 so the process moves to step 805. In step 805 the particular row in the Store_Product table 304 referenced by the Purchase instance is identified, i.e. a Store_Product instance is established and the value or values making up its prime key are fetched from the corresponding foreign key reference in the Purchase instance. The additional values needed to populate the remaining fields of the established Store_Product instance may be found by scanning the log. Since the Purchase instance is the first instance in a pair, the values of interest are those representing the record at the beginning of $\Delta t$. However, these values may be found in a DEL entry entered in the log after the beginning of $\Delta t$, may be even after the end of $\Delta t$. Consequently, it may be necessary to start the scan from the end of the log and scanning backwards until the log entry best representing the values at or prior to the beginning of $\Delta t$ is found for the Store_Product record identified by the primary key. If the log stores all the values of a record when a log entry is made it is sufficient to find this one log entry in order to populate the ORT Instance completely. If only changed values are entered in the log, it will be necessary to continue scanning the log backwards until all values have been obtained.

It should be noted that the selection of log entries during scanning of the log may depend on design choices. For example, implementations may vary regarding whether a log entry should be considered if they represent record values at or before the beginning (or end) of the time window $\Delta t$, or only before the beginning (or end) of the time window. The reason is that it may be undesirable to have overlapping time windows such that a log entry belongs to both the end of one time window and the beginning of a consecutive time window. In some cases the log will not include any relevant log entry that will allow establishment of a proper record instance. This may be the case, for example because the log has been purged or because the initial values from when the database was created have never changed and therefore never been logged. In such cases it may be concluded that the values found in the database itself are older than the time window, and consequently these values may be used for both instances in the pair. In other cases a log entry representing a delete can be found inside, or even after the end of the time window Δt and still represent the appropriate values at the beginning or end of the time window because the deleted entry by necessity represents the values for that record before it was deleted. Exactly which log entries may properly be candidates for finding the proper values may thus depend on implementation details with respect to for example how logging is performed and how the database behaves during synchronization, and how the update window is determined. The principle, however, is to obtain the values that best represent the status of a particular record at the point in time when the current or the previous synchronization started.

After the ORT Instance for a Store_Product has been properly established, the process moves to step 807 where its acceptance is determined. Since the ORT Instance is a child with respect to the RT Instance its acceptance can be determined by the same method, and the process restarts at step 800 for the ORT Instance. In step 801 it may be determined that the first ORT for the Store_Product table 304 is the Product table 305. It may then be determined in step 803 that the Product table 305 is a father with respect to the Store_Product table 304, and consequently that it is not able to restrict the Store_Product table 304. The Product table 305 is an indirect mother to the Item Total table 306, as will be discussed below, and hence it is capable of restricting table 306, but it cannot restrict the Store_Product table 304, and the process moves directly to step 804 where the next ORT for the Store_Product table 304. This will be the Store table 302 so the process will move through step 802 to step 803 where it will be determined that the ORT Store 302 can restrict the RT Store_Product 304, and the process moves on to step 805 where an ORT Instance for the Store entry referenced in the Store_Product instance is established. This process is the same as the one described above for the establishment of a Store_Product instance, and provided that a Store instance is successfully established in step 805, the process moves on to step 807 to determine acceptance for the established Store instance.

Since the Store record type is a mother, the same process can be used again, and the process is restarted at step 800 for the established Store instance. The only subset owner of the Store table 302 is the Store Owner table 301. As explained above, the Store Owner table 301 is not directly or indirectly associated with any acceptance method, and it therefore has no role. It is therefore not able to restrict any subset member, and after passing through steps 801 through 804 once it will be determined in step 802 that no additional ORT is found. The process then moves to step 810 where it is determined that there is a user defined acceptance method defined for the Store table 302. In step 811 acceptance dependent on the user defined acceptance method is determined. In this particular example a user defined acceptance method may depend on parameters that can be found in the parameter holder PDA table 303.

If acceptance is determined to be negative (i.e. this particular store entry should not be present on the particular PDA being synchronized) the process moves to step 808 where acceptance is set to false. When the process terminates in step 813, processing returns to step 807 for the Store_Product instance with this result. In step 809 it will then be determined that the ORT Instance for the Store_Product instance is not accepted so the process should move to step 808 where acceptance for the Store_Product instance is set to false before the process terminates in step 813. Upon termination of this process, the result is reported back to step 807 for the Purchase instance. It can then be determined in step 809 that the ORT Instance for the Purchase being examined is not accepted so the process should move to step 808 where acceptance is set to false. The process then terminates at step 813 after it has been determined that the Purchase instance is not accepted.

Conversely, if the examination of the user defined acceptance method defined for the Store table results in a positive determination of acceptance in step 811 (i.e. this store entry should be present on the particular PDA being synchronized) the process moves to step 812 where acceptance for the established Store instance is set to true. When the processing of the Store instance terminates, this result is reported back to the processing of the Store_Product instance in step 807. It will then be determined in step 809 that the ORT Instance is accepted and the process moves on to step 804 where it is determined that no additional ORTs exist for this record type (the Product record type having already been considered). The process therefore moves on via step 802 to step 810 where it is determined that no user defined acceptance method exists for the Store_Product table. The process then moves to step 812 where acceptance is set to true before the process terminates in step 813. This result is then reported back to step 807 in the process of determining acceptance for the Purchase instance. This process then moves on to step 809, and since acceptance is positive for the ORT Instance, from there to step 804. In step 804 no additional ORT will be identified for the Purchase table 308, so the process will move from step 802 to step 810 where it will be determined that no user defined acceptance method exists for the Purchase table 308. The process then moves on to step 812 where acceptance is set to true for this Purchase instance before the process terminates in step 813.

Figure 9:
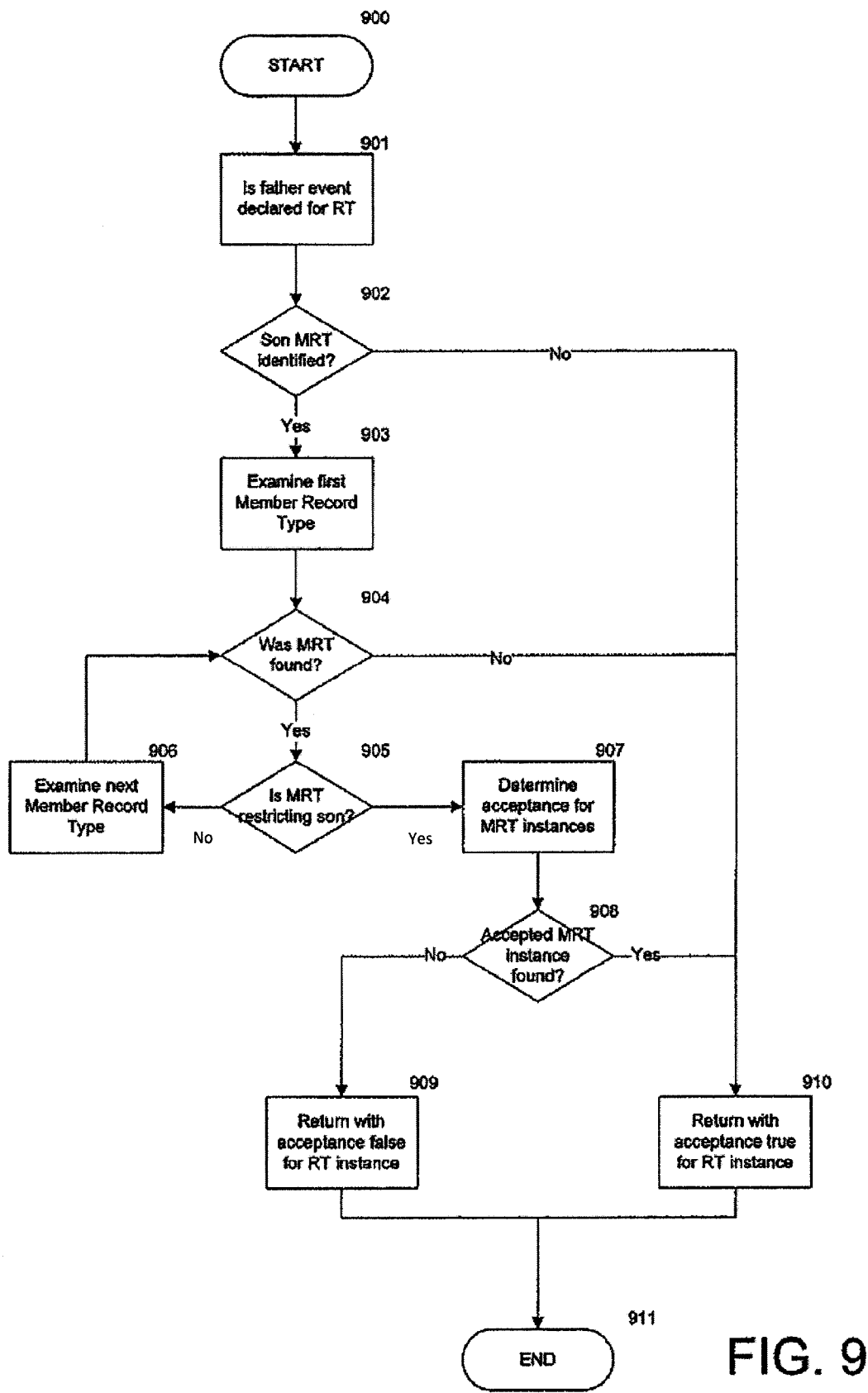
FIG. 9 is a flowchart illustrating determination of whether a database record of a second type is or was accepted in a client at a particular point in time.

Reference is now made to FIG. 9, which illustrates determination of acceptance for a father record type. As already mentioned, a father can be restricted by its son, i.e. by a record type that is not an owner record type, but a subset record type relative to the father. In addition to the acceptance method of FIG. 8 it may therefore be necessary to determine whether a record type instance is restricted by a son. In the simplified code listed above this is shown as a method which is called OnRT_AcceptFather(instance) in the exemplary code listed above. This method is illustrated in FIG. 9. Just like the regular acceptance routine, this method is performed for instances in a pair.

The method starts in an initiating step 900 and proceeds to step 901 where it is determined whether a father event has been declared for the record type, or RT, being examined. If no father event has been declared, no son will be identified, and the method, in step 902, branches off to step 910 where acceptance is set to 'true' for the RT instance before the process terminates in step 911.

If it is determined in step 902 that a father event has been declared for the record type, the identification of the member record type, or MRT, is retrieved and the first Member Record Type is examined in step 903. In step 904, if an MRT is found, the process proceeds to step 905 where it is determined if the examined MRT is the restricting son identified in step 902. If this is not the case, the process examines the next MRT in step

906. It should be noted that if it is determined in step 902 that a restricting son actually exists, this record type should also eventually be found. However, since the father event is declared by the user, the method of finding the restricting record type should be able to handle an erroneously declared father event that returns an identification of a record type that does not exist. If this is the case, the method will eventually determine in step 904 that no additional MRT is found and the process proceeds to step 910 where acceptance is set to 'true' for the RT instance before the process terminates in step 911.

When it is determined in step 905 that an examined MRT is the restricting son of the RT, the process progresses to step 907 where it is determined whether at least one instance in the identified Member Record Type has positive acceptance. This process will be described in further detail below with reference to FIG. 10.

The existence of at least one accepted son means that the father instance needs to be present on the client. If it is determined in step 908 that at least one accepted instance from the MRT table, i.e. one accepted son, was found, the process proceeds to step 910 where acceptance is set to 'true' for the RT instance before the process terminates in step 911. Otherwise, if no accepted instance is found, the method proceeds to step 909 where acceptance is set to 'false' for the RT instance before the process terminates in step 911.

Figure 10:
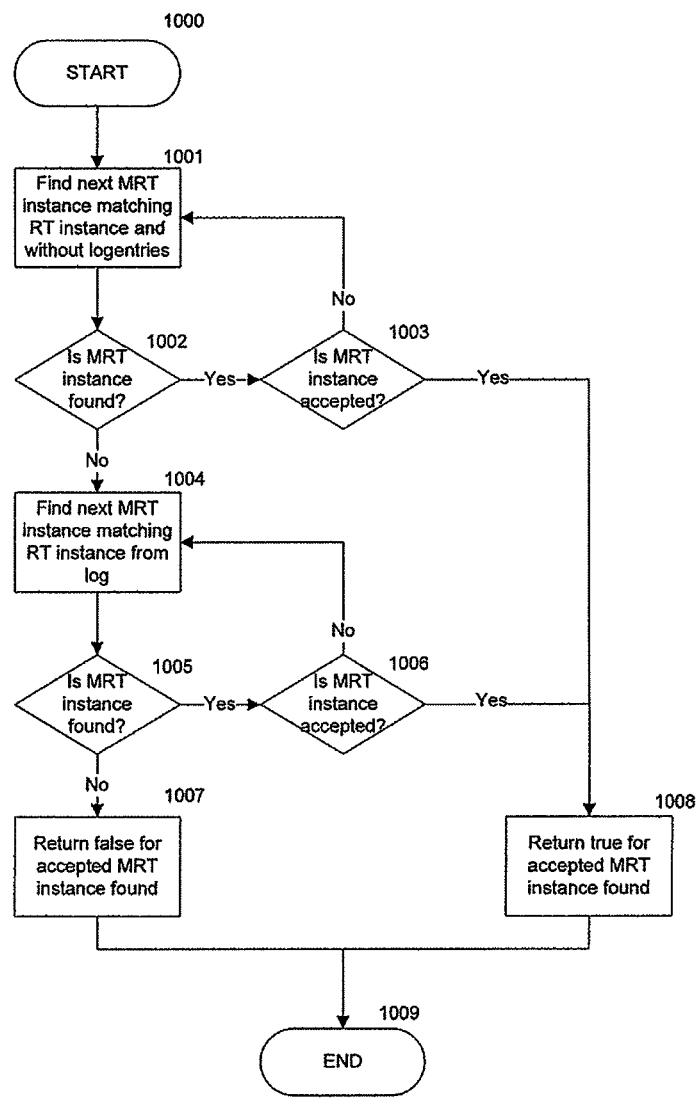
FIG. 10 is a flowchart illustrating certain details of the method for determination of whether any database record of a second type was accepted in a client at a particular point in time.

Reference is now made to FIG. 10 where a method for determining the existence of a restricting son with positive acceptance is illustrated. The method starts in initiating step 1000 and proceeds to step 1001 where a first MRT instance matching the RT instance and which does not have any log entries is identified. There is no guarantee that all MRT instances matching the RT instance have been logged. For example, an MRT may have been accepted by the client ever since the database was created, and no changes may have been made to the record since, or the log may have been purged in a process removing log entries that are older, for example, than a certain number of days. Such instances can be found by examining the database directly, since database entries which are older than the existing log by necessity must have existed unchanged during the relevant time window Δt. This means that it is sufficient that logging is older than the beginning of the time window, such that the method is able to operate even if entries older than the beginning of the time window have been purged from the log, or if the database was created without a log, but logging has been turned on before the beginning of the synchronization time window.

If it is determined in step 1002 that a matching MRT instance without log entry was found, the process proceeds to step 1003 where acceptance for the MRT instance is determined. This may be done using the same method as the one described above with reference to FIG. 8. If it is determined in step 1003 that the identified instance is accepted at the client, the process proceeds to step 1008 where the method returns with 'true' indicating that an accepted MRT instance was found before the process terminates in step 1009. Otherwise, if it is determined in step 1003 that the MRT instance is not accepted, the method returns to step 1001 to find the next MRT instance matching the RT and without log entries. This process continues until it is determined in step 1003 that an accepted MRT instance has been found, or until it is determined in step 1002 that no additional Member Record Type instance matching the Record Type being examined can be found (i.e. that all matching MRT instances have been examined, and none were accepted). In the latter case, the process proceeds to step 1004.

In step 1004 the first MRT instance matching the RT is found from the log. The log is scanned backwards in order to create MRT instances from log entries in a process similar to the one performed for step 805 in FIG. 8. The process seeks to establish the appropriate instance values at the beginning or the end of the window Δt, depending on whether the RT instance is a first or a last in a pair. As mentioned above, log entries that are newer than the appropriate point in time may be relevant, for example a DEL entry may indicate what the values were at an earlier point in time than the time stamp for the DEL entry. The log may therefore be scanned from the latest entry and backwards until the entry that best represents the values at the beginning or the end of the window has been found.

If it is determined in step 1005 that an MRT instance matching the RT is found in the log, the process proceeds to step 1006 where it is determined whether the MRT instance is accepted. If it is determined in step 1006 that the identified instance is accepted at the client, the process proceeds to step 1008 where the method returns with 'true' indicating that an accepted MRT instance was found before the process terminates in step 1009. If, however, it is determined in step 1006 that the MRT instance is not accepted, the method returns to step 1004 to find the next MRT instance matching the RT from the log. This process continues until it is determined in step 1006 that an accepted MRT instance has been found, or until it is determined in step 1005 that no additional Member Record Type instance matching the Record Type being examined can be found (i.e. that all matching MRT instances that can be derived from the log have been examined, and none were accepted). In the latter case, the process proceeds to step 1007 where the method returns with 'false' indicating that no accepted MRT instance was found, before the process terminates in step 1009.

Referring back to FIG. 3, a short example of the processes of FIG. 9 and FIG. 10 can be given. The process of FIG. 9 aims to determine whether a given instance of a pair from the Product table 305 is (or was) accepted by the client being synchronized. For example, the pair may relate to PRODUCT01. In step 901 it is determined that a father event is indeed declared for the Product table 305. In step 902 the identification of the Member Record Type restricting the Product table 305 is retrieved, and this identification will identify the Store_Product table 304. In step 903 the first MRT is examined, which may be the Item Total table 306. Consequently, it is determined in step 904 that an MRT was found, but in step 905 it will be determined that this is not the restricting table identified in step 902. The process therefore moves to step 906 where the next MRT is examined. This will be the Store_Product table 305, and the process therefore proceeds from step 906 to step 904 and on to step 905 where it can now be established that the MRT being examined is the one that is identified as the restricting table, the son to the father RT. The process therefore proceeds to step 907 to determine whether the restricting table, the MRT Store_Product 304, includes any entry that is referencing the entry of the Product table 305 identified in the instance of the pair from that table currently being examined, and that is accepted at the client. For example, is there an entry in the Store_Product table 304 that references PRODUCT01 in the Product table 305 and that is accepted at the client for the appropriate point in time.

The process described with reference to FIG. 10 can be used to answer this question. In steps 1001, 1002 and 1003 entries in the Store_Product table 304 that reference PRODUCT01 and that do not have log entries are examined. As soon as such an entry is found and determined to have positive acceptance, the method returns with the value 'true' to step 907 of FIG. 9, and the method illustrated in FIG. 9 proceeds to step 908 where it is determined that an accepted MRT instance was found and that the method should proceed to step 910 where acceptance for the instance of PRODUCT01 should be accepted at the client.

If, in steps 1001, 1002 and 1003 no accepted MRT instance matching PRODUCT01 can be found, the process proceeds to steps 1004, 1005 and 1006 to determine whether an accepted MRT instance matching PRODUCT01 can be found from the log. If so, the method again returns the value 'true' to step 907 where the method again proceeds to steps 908 and 910 where acceptance for the instance of PRODUCT01 should be accepted at the client.

If no accepted Store_Product instance that references PRODUCT01 can be found, the method of FIG. 10 proceeds to step 1007 before it terminates in step 1009. The values 'false' is returned to step 907 of FIG. 9, indicating that no entry in Store_Product table 304 references PRODUCT01 and is accepted at the client being synchronized. This means that PRODUCT01 is not needed on the client, because no store relevant to the client carries PRODUCT01. The process of FIG. 9 determines in step 908 to determine that no relevant MRT instance was found, and proceeds to step 909 where acceptance for PRODUCT01 is set to 'false' before the method terminates in step 911.

The process of triggering based on roles, represented by step 606 in FIG. 6, will now be described in further detail. As described above, a first method referred to as CollectRecords collects all records in the database that have been changed during the $\Delta t_i$ under consideration and produces the database $\Delta$. This process corresponds to step 502 in FIG. 5. The collected records can be registered in a list of triggers as pairs comprising two instances of the record, one including the values for the record at time $t_{i-1}$, which is at the start of $\Delta t_i$, and one including the values for the record prior to time $t_i$, corresponding to step 503 in FIG. 5. A second method referred to as BrowseExternalAcceptanceChange browses the database to identify records that have not changed any value during $\Delta t_i$ but that has changed its acceptance due to external variables, as described with reference to step 504 in FIG. 5. The identified records were added as pairs to the same list of triggers in step 505. The list created by these two methods can then be used as input to the process of triggering which is represented as step 506 in FIG. 5 and described in further detail in FIG. 6. The process of triggering identifies additional records and records identified in this manner are added as pairs to the list of triggers in steps 603 and 606 in FIG. 6. These triggered pairs are then examined in exactly the same manner as the pairs that were added to the list by the methods CollectRecords and BrowseExternalAcceptanceChange until all pairs in the list have been examined. Thus, the list of triggers and triggered pairs is traversed until all pairs in the list have been examined.

It will be understood that the pairs represented in the list may in principle have any kind of role, irrespective of whether it was added as a result of the collect process, the browse process or if it was triggered by a pair that was already added to the list. All pairs that are examined in step 606 of FIG. 6 in order to determine which additional pairs they should trigger may therefore be examined according to the same procedure no matter how they were added to the list.

It should be noted that because of the process of triggering is repeated for triggered records, it is only necessary to trigger the closest relatives of a triggering pair, not the entire subset constraint hierarchy of that pair. For example, if a mother triggers a child it does not also have to trigger children of that child, since they in turn will be triggered by the first child. It is, however, consistent with the principles of the invention to define other schemes of triggering that does trigger further down in the subtree of a triggered pair.

It will be recalled from the description of FIG. 3 that six distinct roles may be defined. The roles are here referred to as mother, child, son, father, sister and brother. A record type does not, however, necessarily have only one role. A role is defined by how a record type relates to another record type, and since a record type may relate to several other record types it may have several roles. When a pair which represents instances of a particular record type acts as a trigger, it may be necessary to examine all the roles of that record type.

The following cases can be identified:
i) The record type is a mother
ii) The record type is a child
iii) The record type is a mother, and a child
iv) The record type is a mother, a child, and a son
v) The record type is a mother, a child, a son, and a brother
vi) The record type is a child, and a son
vii) The record type is a child, a son, and a brother
viii) The record type is a father
ix) The record type is a sister In addition there are record types that have no role. A pair with no role will not trigger anything. In the example of FIG. 3, the Store Owner 301 has no role.

According to case i) the record type is a mother. This means that the record type only relates to other record types that are children of this record type. In the example of FIG. 3 the Store record type 302 is such a record, and it has two children, the PDA record type 303 and the Store_Product record type 304. The children of a mother are candidates for triggering, or more precisely, any pair of instances of these two record types that include a foreign key reference to the particular Store under consideration, should be added to the list of triggers. It is not necessary to trigger any additional record types. If any such record types should be added to the list of triggers this will be done in due time when the triggered children are examined. In this case, any Product, Purchase, Sale or Item Total pair will be triggered when Store_Product is examined. The triggering can be handled by a method that may be referred to as AddChildren.

According to case ii) the record is a child. Apart from parameter holders, child record types do not have to trigger record types they are children of. This will be realized by the fact that a child record type holds some additional information about the record type it is a child of, and this additional information does not make the parent record type relevant. And when it comes to parameter holders, they trigger their mothers in step 603 of FIG. 6. According to the embodiment of the invention described here, triggering based on roles is a separate step 606, and so parameter holders do not trigger mothers in their capacity of being a child of that mother.

In FIG. 3 there are four examples of record types that have the role of child; the PDA record type 303, the Store_Product record type 304, the Sale record type 307 and the Purchase record type 308. Child record types only trigger their children, and since record types PDA 303, Sale 307 and Purchase 308 have no children, they do not trigger any additional pairs in this particular example. The Store_Product record type 304 does, however, but since this record type is also a son and a brother it will be discussed below. Triggering based on pairs of record types that have the child role can again be handled by the AddChildren method.

According to case iii) the record type is both a mother (i.e. it has a filter associated with it), but it is also itself a child of some other record type. There are no record types in FIG. 3 that have these two roles. As mentioned above, pairs do not trigger their mothers. Consider, for example, the case where there is a change to the bibliography of an author that is not stocked by a particular store. If a client holding the inventory of that store is synchronized, a change in the bibliography does not have to trigger the pair of Author record type representative of that author. However, both as a mother and as a child the record type under consideration will need to trigger its own children, because they may hold information necessary to fulfill all subset constraints. Again the method AddChildre can be used to handle the triggering.

According to case iv) the record type of the pair under consideration is not only a mother and a child, but also a son. Again there are no examples of any such combination in FIG. 3. As above, the method AddChildren can be used to add the children of the pair under consideration. However, since the record type is also a son, it may be necessary to add its father. This can be done by a method called AddFather, and will be discussed in further detail below.

According to case v) the pair under consideration is of a record type that is a mother, a child, a son and also a brother. The first three roles have the same effect as above, and the role of brother may make it necessary to add the brother's sister. This can be done by the method AddSisterOfBrother, which will be discussed in further detail below.

According to case vi) the pair is of record types that are child and son, and it may be necessary to add its children as well as its father.

According to case vii) the pair is of record types that have the roles of child, son, and brother. The record type Store_Product 304 in FIG. 3 is an example of such a combination of roles. The record type is a child of the Store record type 302 and a son of the Product record type 305. In addition it is a brother of the record type Item Total 306. A record type is a son when it includes a reference to a father. The son role serves to restrict the father role. In this case, it serves to ensure that only the products from table 305 that actually are stocked by a given store 302 are imported to a client PDA that holds the inventory of that store. In addition the pair of record type 304 is a brother to the Item Total record type 306. The Item Total record type 306 is a nonrestrictive subset member of the father record type Product 305. This means that a change in the brother record type impacts the sister record type. An example would be that a change in Store_Product adding a new product from the Product table 305 to the inventory of a store in the Store table 302 will have an effect on the Item Total table 306 in that sales of the newly added Product (or Item) in that store should be added as a new record to the Item Total table 306, and conversely, in order to make the total sales of a given Product available on a client, it is not necessary to add only the product from the father table 305, but also the total for that product from the sister table 306. This can be handled by a method that will be referred to as AddSisterOfBrother.

In summary, for a pair that instantiates a record type that combines the roles of child, son, and brother, it is necessary to add the relevant children, such as those of record type Sale 307 and Purchase 308, the relevant father, as exemplified by the Product record type 305, and sister, as exemplified by the Item Total record type 306. This can be handled by methods referred to here as AddChildren, AddFather, and AddSisterOfBrother.

Turning now to case viii) where the record type only has the father role, additional considerations become necessary. It may be necessary to add sister, but only if the pair representing the father is an UPD. This will be understood by considering the example of FIG. 3, where the father record type 305 represents a product, while the sister record type 306 represents a total for that product. It will be realized that if the pair representing the father is a new product (INS) the sister should only be triggered if the product is also added to the particular store in question, in which case it will be triggered by the addition of a new Store_Product 304 associating the Store 302 and the Product 305, namely its brother. Similarly, if a product is removed (DEL) from the father it will also have to be removed from Store_Product, otherwise there would be a Store_Product which referenced a non-existent Product. Again, the sister may be triggered by the brother in the Store_Product table 304. However, if the change in the father table is an UPD which is not reflected in the brother table, associated sister pairs may have to be triggered by the father pair.

It should be noted that in relation to a father, a sister is a subset member, similar to a child, but the role is still referred to as a sister since there will always be a brother to that sister.

The final case ix) is the case where the triggering pair is a sister. A sister may be referred to by other record types, which can be thought of as children of that sister, but since a child of a sister is relevant only through its relationship with a father the child of a sister will also be classified as a sister and may thus be handled by the same triggering method.

The example discussed above with reference to FIG. 3 includes only one table with a declared acceptance method, namely the store table 302. If it is determined that some tables are not needed in a client, for example that the sale table 307 and the purchase table 308 are unnecessary in a client that is used for inventory, additional acceptance methods can be declared for these tables in order to make sure that they are not triggered and transferred to that client.

The above discussion explains which roles are triggered depending on the role or roles of the trigger. It remains to determine exactly which entries in a table should be added as a pair to the list of triggers. This will now be described in terms of methods that handle addition of pairs to the list of triggers based on the determined role or roles of the triggering pair.

Whenever a pair is triggered and added to the list of triggers, the two instances of the triggered pair must receive their proper values. As described above when creation of ORT instances during determination of acceptance, two possibilities exist when instances are created. The first possibility is to retrieve the appropriate values from the log. Provided that log entries for the record type entry actually exist it may be possible to retrieve values that are associated with a time stamp, and instances corresponding to appropriate time stamps for the synchronization window $\Delta t$ can be created. If no log entry can be found, the appropriate values can be retrieved from the database itself under the assumption that since no log entry exist, the values must have remained unchanged since before the beginning of the time window. This method for populating instances of the pairs can be performed for all the triggering methods discussed below, and will not be repeated during the discussion of each individual method. It should also be noted that in order to avoid duplication of records on the client, pairs should not be entered more than once in the list of triggers. This can be avoided by including a check in each of the methods described below such that none of them enter a pair in the list if that pair already is in the list. Alternatively, the list can be scanned and duplicates removed after the process of triggering is completed.

First, referring back to FIG. 6, if it is determined in step 602 that the triggering pair is a parameter holder, the corresponding mother is triggered in step 603 using a method referred to as AddMaterFamilias(pair). The method starts by verifying that the record type of the triggering pair actually is a parameter holder. If it is not, the method exits, since there is nothing more to do. If it is, the appropriate Owner Record Type must be identified. According to the example of FIG. 3, the triggering parameter holder will be a pair from the PDA table 303 and the ORT will be the Store table 302.

It should be noted that the parameter holder may trigger differently from other pairs. First, in general record types with references to other record types may not have empty (null) values because this would violate subset constraints. For example, a store_product entry in table 304 represents a particular product that can be found in a particular store, and consequently it should always refer to a store in the store table 302 and a product in the product table 305. Similarly, an entry in the purchase table 308 represents an actual purchase of a product in a store, and it should therefore always refer to a store_product entry in the store_product table 304. No purchase entry should exist without this association with a store and a product. A parameter holder entry, however, may exist for a particular PDA which is currently not assigned to any particular store, with a foreign key reference which is currently a null value.

Another difference is that a change in parameter value may actually trigger two mothers. For example, if a PDA in the example of FIG. 3 is first assigned to one store and this changes to a different PDA, it will be necessary to trigger both stores, because the original store should be removed from the PDA while the new store should be added to the PDA.

Consequently, the method may address how the subset link values have changed between the two instances in the triggering pair. For each ORT entry identified by a subset link in the pair, a pair may be created and entered in the list of triggers. The following possibilities exist. If there was no connecting value (e.g. a null value for a foreign key reference) prior to Δt and no such value within Δt, i.e. neither instance in the pair actually reference entries in the ORT, the method exits and no pair is added to the list of triggers. If there was a connecting value prior to Δt, but no such value within Δt, this means that the first instance of the triggering pair references an ORT entry (e.g. a store in Store table 302), but the second instance does not reference any such entry. A pair representing the ORT entry referenced by the first instance should then be entered as an UPD to the list of triggers. However, since the identified ORT entry is not referenced by the last instance in the triggering pair, the pair will most likely be changed to a DEL during step 507 of FIG. 5 and step 715 of FIG. 7. In alternative embodiments of the invention this can be verified during triggering and the pair can be entered directly as a DEL.

If the triggering pair had no connecting subset value prior to Δt, but did have a connecting value during Δt, a pair representing the ORT entry identified by the connecting value should be added to the list of triggers. Again, the pair can be added as an UPD and changed during the process of FIG. 7, in step 718, to an INS.

Finally, the triggering pair may include a first instance that references one ORT entry and a last instance that references a different ORT entry, representing, in terms of the example of FIG. 3, a change from one store to another. In this case one pair may have to be added to the list of triggers representing two instances of the ORT entry referenced by the connecting subset value of the first instance of the triggering pair, and a second pair may be added for the ORT entry referenced by the connecting subset link of the last instance of the triggering pair. Both may be added as UPD to the list of triggers, and during filtering and adjusting in accordance with the method described with reference to FIG. 7 the first pair may be changed to a DEL and the second pair may be changed to an INS.

The remaining triggering methods are performed when the process of FIG. 6 has progressed to step 606. In this step one or more methods may be performed depending on the role of the triggering record. The first of these methods to be described will be referred to as AddChildren(pair). This method is performed if the record type of the triggering pair has at least one of the roles of mother and child. The method is only performed if it is determined in step 604 of FIG. 6 that the triggering pair should update the client and in step 605 that the pair has an acceptance change. In some embodiments of the invention the methods making these determinations may be called from within AddChildren(pair) in alternative embodiments steps 604 and 605 are performed before the triggering methods of step 607 are performed.

The method proceeds to examine all subset member record types of the triggering record type. A subset member record types will be referred to as a Member Record Type or MRT. Each MRT that is a child with respect to the record type of the triggering pair, referred to as the RT, is identified. An MRT is a child if the RT is a mother or a child. The RT is a mother if a user defined acceptance method exists for the RT. The RT is a child if it is in the subtree of a mother.

For each MRT that is a child of RT, the log is scanned in order to identify entries that reference the RT entry, i.e. the triggering pair. The scanning process is similar to that described above when discussing creation of ORT or MRT instances during determination of acceptance. Scanning can be performed from the end of the log, considering all entries for records in the MRT table that reference the triggering pair. Appropriate candidates can be found after, within or prior to the window Δt. For each appropriate log entry that is found, a pair is populated with the appropriate values found in the log and added to the list of triggers, unless a corresponding pair has not already been added to the list of triggers. The method creates all pairs that can be established from the log from each MRT that is determined to be a child of the triggering pair.

It will be realized that children of the triggering pair may exist without having any log entry. It is therefore necessary to find entries in the database that do reference the record instantiated by triggering pair and that do not have any log entries. Any such database entry is added to the list of triggers as a pair with values fetched directly from the database, unless a corresponding pair is already in the list of triggers. This is repeated for all MRT tables until all children have been found and added to the list of triggers.

If a triggering pair is determined to have the role of son, a triggering method referred to as AddFather(pair) is performed. Again, the steps described with reference to 604 and 605 may be performed prior to or as part of this method. If it is determined that the trigger is an INS or a DEL, or if it is an UPD with acceptance change, the father(s) must be triggered. Fathers are triggered by examining all ORT of the son RT. A record type is a father if a father event exists for the record type, and the record type is not a mother. In other words all ORTs to the triggering RT that have a declared father event but not a declared mother event, is a father. For all subset owners that are found to be fathers, a pair is created for the entry referenced by the son. Each created pair may include instances populated from the log (or from the database if no log entries exist). In the case that the son has been updated such that the referenced father has changed from one entry to another, it may be necessary to trigger both of the referenced fathers.

In general, if the son was deleted in Δt, the father must be present prior to the beginning of Δt, and if the son was inserted in Δt, the father must be present at the end of Δt. However, since a father occurrence can be present on a client on behalf of many sons, it is not always appropriate to delete a father from the client database when it is determined that a restricting son is deleted from the server database and processing on the server side indicates that the son as well as its father should be deleted from the client. The reason is that a different son, e.g. a different table row from a table having the son role with respect to the father, may have been added to the client database during a previous synchronization, and this other son may remain in the client database and thus require the presence on the father on the client. The existence of such a son is not readily available from the information used to perform synchronization at the server side. This may instead be handled by transferring a DEL instruction for the father pair to the client and then perform a check on the client to determine whether the DEL can be performed, or whether there are other sons on the client that require the continued existence of the father on the client. Similarly, when an insert of a new son triggers an insert of a father and processing on the server side indicates that both the triggering son and the triggered father should be transferred to the client, that father may already be present on the client as a result of a prior synchronization of the client. This, too, may be handled on the client side. According to one embodiment of the invention, all other updates to the client are performed before fathers are updated, and fathers are updated such that no necessary father is deleted and no father is inserted twice.

If the triggering record type is a brother, it may be necessary to trigger sisters. An example of such a situation is found in FIG. 3, where the Item Total table 306 is a sister to the Store_Product table 304. Triggering of sisters may be performed by a method referred to as AddSisterOfBrother(pair). The method finds the father of the brother in the same way as described above in the AddFather method (a brother has the role of son to a father). The method then proceeds to find all record types that are sisters in the subtree below the father. So, using the method outlined above, all sisters in the subtree below the father are identified, and for each record type starting with the father, a triggering process similar to that of AddChildren is performed. This means that for the referenced examined and relevant entries from all record types in this subtree are retrieved either from the log or from the database are entered as pairs in the list of triggers.

Finally, if the triggering pair is a father or a sister, a method called AddSister(pair) may be performed. The AddSister (pair) is similar to the method AddSisterOfBrother(pair) except that it is not necessary to identify indirect mothers. Instead, for each sister (i.e. each MRT of the RT of the triggering pair) all appropriate entries referencing the triggering pair are identified and a pair is added to the list of triggers with appropriate values found either in the log or in the database in a process similar to the one described for AddChildren(pair).

Returning again to FIG. 5, after all triggering has been completed in accordance with the methods described above, the process proceeds to determine filtering and adjustment, as already described, in step 507 and to perform the actual synchronization.

When a pair has been processed in accordance with the method described with reference to FIG. 7 in order to determine whether it should update the client and if so, what its proper update status is, update, insert or delete, an XML message including all the values of the record can be created and sent to the client where it is received and acted upon by a method that is operable to import data into the client database. According to some embodiments the server may use asynchronous SOAP calls. (SOAP 1.2 is defined in a recommendation from W3C which is hereby incorporated in its entirety by reference.) However, other communication protocols and messaging formats are within the scope of the invention.

As mentioned above with reference to the triggering process, it is possible to perform triggering and updating record by record, by processing a batch of records at a time, or by performing all records simultaneously. As such, the synchronization messages sent to the client can include just one record, a batch of records, or all records that should be inserted, deleted or updated.

What is claimed is:

1. A method in a server computer for updating an electronic client device from said server computer, said server computer containing a first database with a plurality of database records and a log of database operations performed by said server computer, and said electronic client device containing a partial representation of said first database including database records accepted at said client device, the method comprising:

scanning said log in order to identify a first record that has been inserted into, deleted from or changed in said first database or has had its acceptance at said client device changed by a declared acceptance rule subsequent to a previous update of said client;

identifying a second record which has not been added to, deleted from or changed in said first database, nor had its acceptance at said client device changed by any declare acceptance rule subsequent to said previous update, said second record being related to said first record through a first foreign key constraint wherein said first foreign key constraint is a requirement that a foreign key in one of said first and said second record uniquely identifies the other of said first and said second record;

identifying a third record which has not been added to, deleted from or changed in said first database nor had its acceptance at said client device changed by any declared acceptance rule subsequent to said previous update, said third record being related to said second record through a foreign key constraint wherein said second foreign key constraint is a requirement that a foreign key in one of said second and said third record uniquely identifies the other of said second and said third record;

transmitting first data from said server computer to said client device, said first data representing an instruction to said client device to perform an associated insert into, deletion from or change of said first record in said partial representation of said first database, or, if the acceptance for the record has changed, perform an insert into said partial representation of said first database if the record is now accepted and a deletion from said partial representation of said first database if the record is no longer accepted;

transmitting second data from said server computer to said client device, said second data representing an instruction to said client device to insert said second record into said partial representation of said first database if the absence of said second record would cause a foreign key constraint violation after execution of the instruction represented by said first data or;

delete said second record from said partial representation of said first database if the presence of said second record would cause a foreign key constraint violation after execution of the instructions represented by said first data; and transmitting third data from said server computer to said client device, said third data representing an instruction to said client device to insert said third record into said partial representation of said first database if the absence of said third record would cause a foreign key constraint violation after execution of the instruction represented by said second data, or delete said third record from said partial representation of said first database if the presence of said third record would cause a foreign key constraint violation after execution of the instructions represented by said second data.

2. The method of claim 1, wherein said the step of scanning said log including:

determining the beginning and the end of a time window, the beginning representing a point in time associated with said previous update of said client device, the end representing a point in time associated with a current update of said client device; and scanning said log of database operations performed by said server computer to identify said first record as a record upon which at least one database operation has been performed during said time window.

3. The method of claim 1, further comprising:

recursively repeating a step of identifying an additional record which has not been added to deleted from or changed in said first database nor had its acceptance at said client device changed by any declared acceptance rule subsequent to said previous update, but which is related to a previously identified record through a foreign key constraint until the recursion terminates; and transmitting additional data from said server computer to said client device, said additional data representing instructions to insert identified additional records into and delete identified additional records from said partial representation of said first database until all foreign key constraints are fulfilled in said partial representation of said first database.

4. The method of claim 1, wherein said first record is of a record type associated with a declared rule for determining acceptance of a value representative of the state of a record of that record type on a client, and said second record is of a record type which is a subset member record type with respect to said first record type.

5. The method of claim 1, wherein said first record is of a record type which is a subset member record type of a record type associated with a declared rule for determining acceptance of a value representative of the state of a record of that record type on a client, and said second record is of a record type that is a subset member record type with respect to said first record type.

6. The method of claim 1, wherein said first record is of a record type which is a subset member of the record type of said second record and a subset member of a record type different from the record type of said first record and the record type of said second record;

said record with a record type different from said first record and said second record is associated with a declared rule for determining acceptance of a value representative of the state of a record of that record type on a client; and said second record is of a record type associated with a declared rule stating that records of that record type should only be accepted in said partial representation of said first database if required to fulfill a foreign key constraint relating it to at least one record of the record type of the first record.

7. The method of claim 1, wherein said first record is of a record type associated with a declared rule stating that records of said first record type should only be accepted in said partial representation of said first database if required to fulfill a foreign key constraint relating it to at least one record of a record type different from said first record and said second record, and said second record is of a record type that is a subset member record type with respect to said first record type.

8. A server configured to update an electronic client device, said server computer containing a first database with a plurality of database records and a log of database operations performed by said server computer, and said electronic client device containing a partial representation of said first database including database records accepted at said client device, the server comprising:

a processor coupled to a memory programmed to:

scan said log in order to identify a first record that has been inserted into, deleted from or changed in said first database or has had its acceptance at said client device changed by a declared acceptance rule subsequent to a previous update of said client;

identify a second record which has not been added to, deleted from or changed in said first database, nor had its acceptance at said client device changed by any declared acceptance rule subsequent to said previous update, said second record being related to said first record through a first foreign key constraint, wherein said first foreign key constraint is a requirement that a foreign key in one of said first and said second record uniquely identifies the other of said first and said second record; and identify a third record which has not been added to, deleted from or changed in said first database nor had its acceptance at said client device changed by any declared acceptance rule subsequent to said previous update, said third record being related to said second record through a foreign key constraint, wherein said second foreign key constraint is a requirement that a foreign key in one of said second and said third record uniquely identifies the other of said second and said third record; and cause the server to:

transmit first data to client device, said first data representing an instruction to said client device to perform an associated insert into, deletion from or change of said first record in said partial representation of said first database or, if the acceptance for the record has changed, perform an insert into said partial representation of said first database if the record is now accepted and a deletion from said partial representation of said first database if the record is no longer accepted;

transmit second data to said client device, said second data representing an instruction to said client device to insert said second record into said partial representation of said first database if the absence of said second record would cause a foreign key constraint violation after execution of the instruction represented by said first data, or delete said second record from said partial representation of said first database if the presence of said second record would cause a foreign key constraint violation after execution of the instructions represented by said first data; and transmit third data to said client device, said third data representing an instruction to said client device to insert said third record into said partial representation of said first database if the absence of said third record would cause a foreign key constraint violation after execution of the instruction represented by said second data, or delete said third record from said partial representation of said first database if the presence of said third record would cause a foreign key constraint violation after execution of the instructions represented by said second data.

9. The server of claim 8, wherein said processor is programmed to scan said log by:
  determining the beginning and the end of a time window, the beginning representing a point in time associated with said previous update of said client device, the end representing a point in time associated with a current update of said client device; and
  scanning said log of database operations performed by said server computer to identify said first record as a record upon which at least one database operation has been performed during said time window.

10. The server of claim 8, wherein said processor is further programmed to:
  recursively repeat a step of identifying an additional record which has not been added to deleted from or changed in said first database nor had its acceptance at said client device chanced by any declared acceptance rule subsequent to said previous update, but which is related to a previously identified record through a foreign key constraint until the recursion terminates; and
  cause the server to transmit additional data to said client device, said additional data representing instructions to insert identified additional records into and delete identified additional records from said partial representation of said first database until all foreign key constraints are fulfilled in said arial representation of said first database.

11. The server of claim 8, wherein said first record is of a record type associated with a declared rule for determining acceptance of a value representative of the state of a record of that record type on a client, and said second record is of a record type which is a subset member record type with respect to said first record type.

12. The server of claim 8, wherein said first record is of a record type ich is a subset member record type of a record type associated with a declared rule for determining acceptance of a value representative of the state of a record of that record type on a client, and said second record is of a record type that is a subset member record type with respect to said first record type.

13. The server of claim 8, wherein said first record is of a record type which is a subset member of the record type of said second record and a subset member of a record type different from the record type of said first record and the record type of said second record;
  said record with a record type different from said first record and said second record is associated with a declared rule for determining acceptance of a value representative of the state of a record of that record type on a client; and
  said second record is of a record type associated with a declared rule stating that records of that record type should only be accepted in said partial representation of said first database if required to fulfill a foreign key constraint relating it to at least one record of the record type of the first record.

14. The server of claim 8, wherein said first record is of a record type associated with a declared rule stating that records of said first record type should only be accepted in said partial representation of said first database if required to fulfill a foreign key constraint relating it to at least one record of a record type different from said first record and said second record, and said second record is of a record type that is a subset member record type with respect to said first record type.

15. A non-transitory computer readable medium on which is embodied a computer program for enabling a server computer to update an electronic client device, said server computer containing a first database with a plurality of database records and a log of database operations performed by said server computer and said electronic client device containing a partial representation of said first database including database records accepted at said client device, the computer program comprising instructions which, when executed, cause the server computer to perform the following:
  scanning said log in order to identify a first record that has been inserted into deleted from or changed in said first database or has had its acceptance at said client device changed by a declared acceptance rule subsequent to a previous update of said cent;
  identifying a second record which has not been added to deleted from or changed in said first database, nor had its acceptance at said client device changed any declared acceptance rule subsequent to said previous update said second record being related to said first record through a first foreign key constraint, wherein said first foreign key constraint is a requirement that a foreign key, in one of said first and said second record uniquely identifies the other of said first and said second record;
  identifying a third record which has not been added to deleted from or changed in said first database nor had its acceptance at said client device changed by any declared acceptance rule subsequent to said previous update, said third record being related to said second record through a foreign key constraint, wherein said second foreign key constraint is a requirement that a foreign key in one of said second and said third record uniquely identifies the other of said second and said third record;
  transmitting first data from said server computer to said client device, said first data representing an instruction to said client device to perform an associated insert into, deletion from or change of said first record in said partial representation of said first database, or, if the acceptance for the record has changed, perform an insert into said partial representation of said first database if the record is now accepted and a deletion from said partial representation of said first database if the record is no longer accepted;
  transmitting second data from said server computer to said client device, said second data representing an instruction to said client device to
    insert said second record into said partial representation of said first database if the absence of said second record would cause a foreign key constraint violation after execution of the instruction represented by said first data or;
    delete said second record from said partial representation of said first database if the presence of said second record would cause a foreign key constraint violation after execution of the instructions represented by said first data; and
  transmitting third data from said server computer to said client device, said third data representing an instruction to said client device to
    insert said third record into said partial representation of said first database if the absence of said third record would cause a foreign key constraint violation after execution of the instruction represented by said second data, or delete said third record from said partial representation of said first database if the presence of said third record would cause a foreign key constraint violation after execution of the instructions represented by said second data.

16. The computer readable medium of claim 15, the step of scanning said log including:
determining the beginning and the end of a time window, the beginning representing a point in time associated with said previous update of said client device, the end representing a point in time associated with a current update of said client device; and
scanning said log of database operations performed by said server computer to identify said first record as a record upon which at least one database operation has been performed during said time window.

17. The computer readable medium of claim 15, further comprising instructions which, when executed, cause the server computer to:
recursively repeat a step of identifying an additional record which has not been added to, deleted from or changed in said first database nor had its acceptance at said client device changed by any declared acceptance rule subsequent to said previous update, but which is related to a previously identified record through a foreign key constraint until the recursion terminates; and
transmit additional data from said server computer to said client device, said additional data representing instructions to insert identified additional records into and delete identified additional records from said partial representation of said first database until all foreign key constraints are fulfilled in said partial representation of said first database.

18. The computer readable medium of claim 15, wherein said first record is of a record type associated with a declared rule for determining acceptance of a value representative of the state of a record of that record type on a client, and said second record is of a record type which is a subset member record type with respect to said first record type.

19. The computer readable medium of claim 15, wherein said first record is of a record type which is a subset member record type of a record type associated with a declared rule for determining acceptance of a value representative of the state of a record of that record type on a client, and said second record is of a record type that is a subset member record type with respect to said first record type.

20. The computer readable medium of claim 15, wherein said first record is of a record type which is a subset member of the record type of said second record and a subset member of a record type different from the record type of said first record and the record type of said second record;
said record with a record type different from said first record and said second record is associated with a declared rule for determining acceptance of a value representative of the state of a record of that record type on a client; and
said second record is of a record type associated with a declared rule stating that records of that record type should only be accepted in said partial representation of said first database if required to fulfill a foreign key constraint relating it to at least one record of the record type of the first record.

21. The computer readable medium of claim 15, wherein said first record is of a record type associated with a declared rule stating that records of said first record type should only be accepted in said partial representation of said first database if required to fulfill a foreign key constraint relating it to at least one record of a record type different from said first record and said second record, and said second record is of a record type that is a subset member record type with respect to said first record type.

* * * * *